United States Patent

[11] 3,533,350

[72] Inventors Sophocles J. Dokos
Oak Park;
Chester H. Wickenberg, Elgin; Charles E. Swanson; Bernardas Gasparaitis, Chicago, Illinois
[21] Appl. No. 821,578
[22] Filed May 5, 1969
A division of Ser. No. 668,597, Sept. 18, 1967, now Patent No. 3,472,154.
[45] Patented Oct. 13, 1970
[73] Assignee Sunbeam Corporation
Chicago, Illinois
a corporation of Illinois

[54] ELECTRIC TOASTER
27 Claims, 22 Drawing Figs.
[52] U.S. Cl. .................................................. 99/329, 337/3
[51] Int. Cl. .................................................. A47j 37/08
[50] Field of Search ...................................... 99/326–335, 391, 400, 385; 219/532, 530, 538, 542, 524; 337/3

[56] References Cited
UNITED STATES PATENTS

| | | | |
|---|---|---|---|
| 533,795 | 2/1895 | Edwards | 219/524 |
| 2,522,724 | 9/1950 | Scharf | 219/542 |
| 2,548,511 | 4/1951 | Anderson | 219/530 |
| 2,590,334 | 3/1952 | Loomer | 99/335 |
| 2,655,860 | 10/1953 | Smith | 99/329 |
| 2,667,828 | 2/1954 | Koci | 99/400X |
| 2,669,925 | 2/1954 | Rouse et al. | 99/329X |
| 2,685,633 | 8/1954 | Olson et al. | 219/532 |
| 2,717,951 | 9/1955 | Swicker | 219/532 |
| 2,835,192 | 5/1958 | Sivacek | 99/329 |
| 2,838,989 | 6/1958 | Clark et al. | 99/385UX |
| 2,920,551 | 1/1960 | Schmall | 99/329 |
| 3,089,406 | 5/1963 | Turner | 99/329 |
| 3,169,469 | 2/1965 | Parr | 99/400 |
| 3,256,805 | 6/1966 | Swanson | 99/400 |
| 3,349,692 | 10/1967 | Jones | 99/331 |
| 3,452,670 | 7/1969 | Huck et al. | 99/329 |

Primary Examiner—Billy J. Wilhite
Attorney—George R. Clark

ABSTRACT: An electric toaster having a long, narrow entrance slot for receiving slices of bread for toasting with slices in an in-line or tandem relationship so that the common edges of the slices are adjacent each other. The overall width of the toaster is narrow, and many internal parts are disposed between parallel heaters which are supported by an insulating member at each end of the toasting chamber. A crumb tray is pivotally supported by plastic end panels, and a thermostatic control and switch assembly is mounted on an outer shell. Bread guides stamped from sheet metal are mounted independently of the electric heaters. A bread carriage is moved vertically by a thermal motor incorporating the heaters.

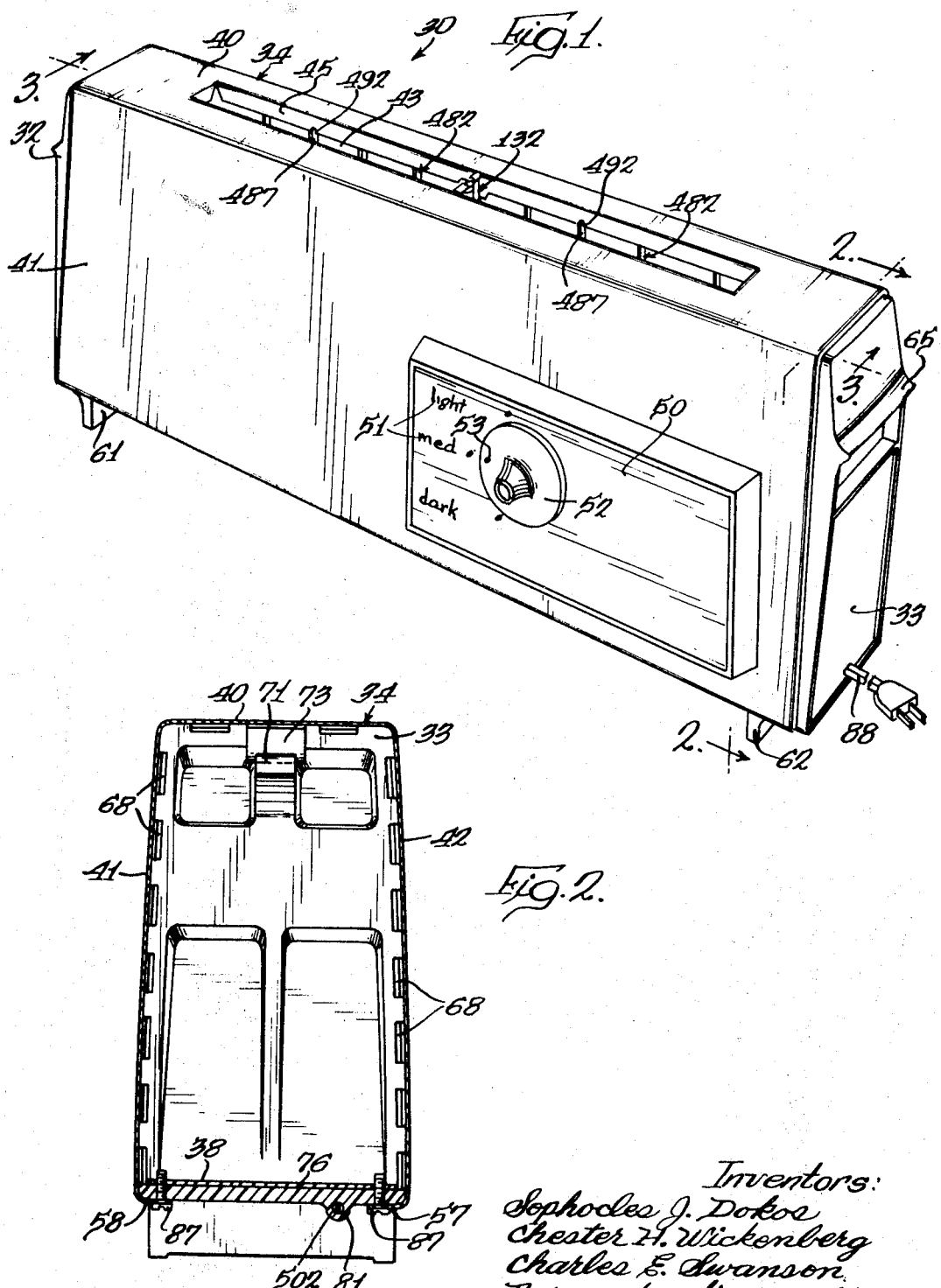

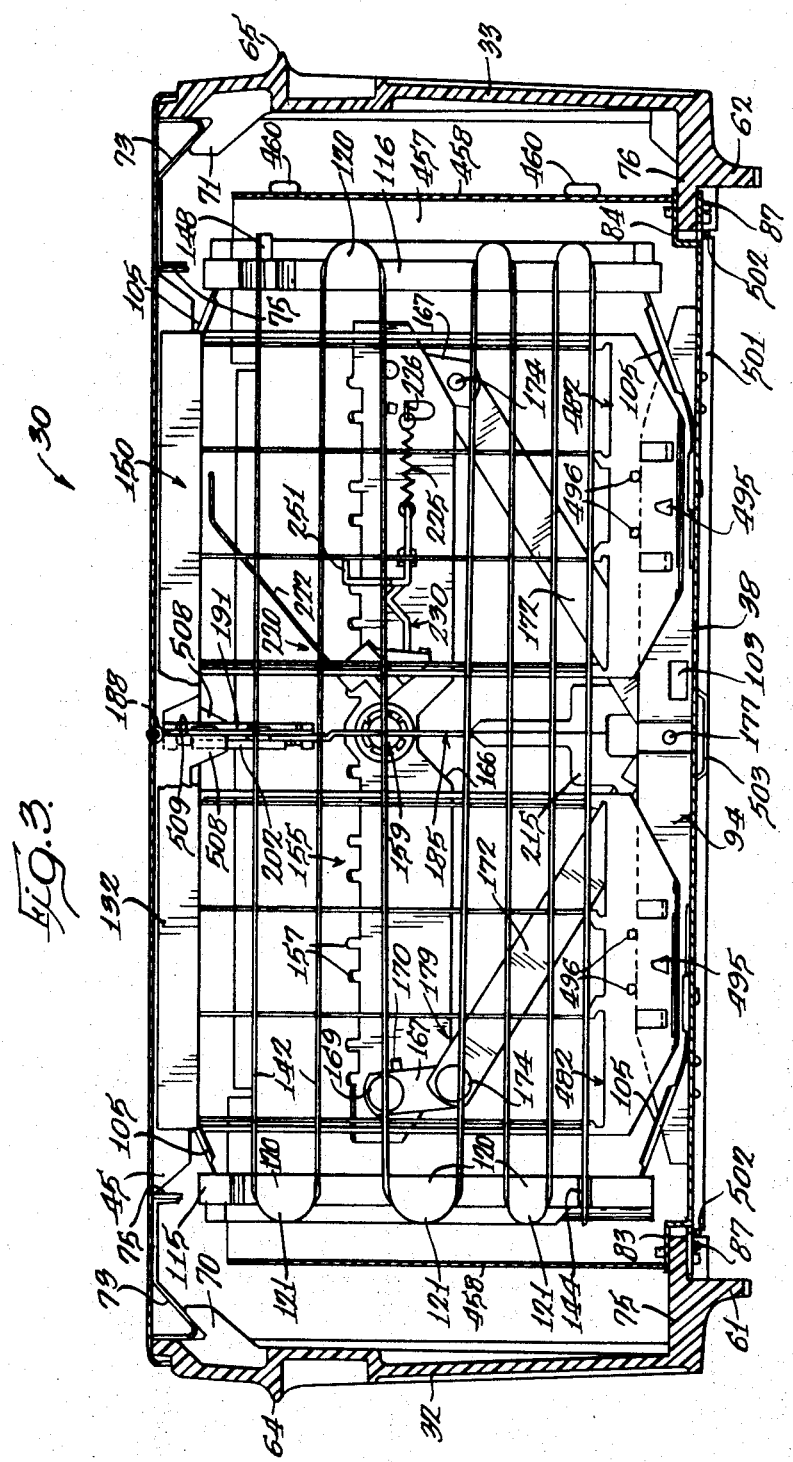

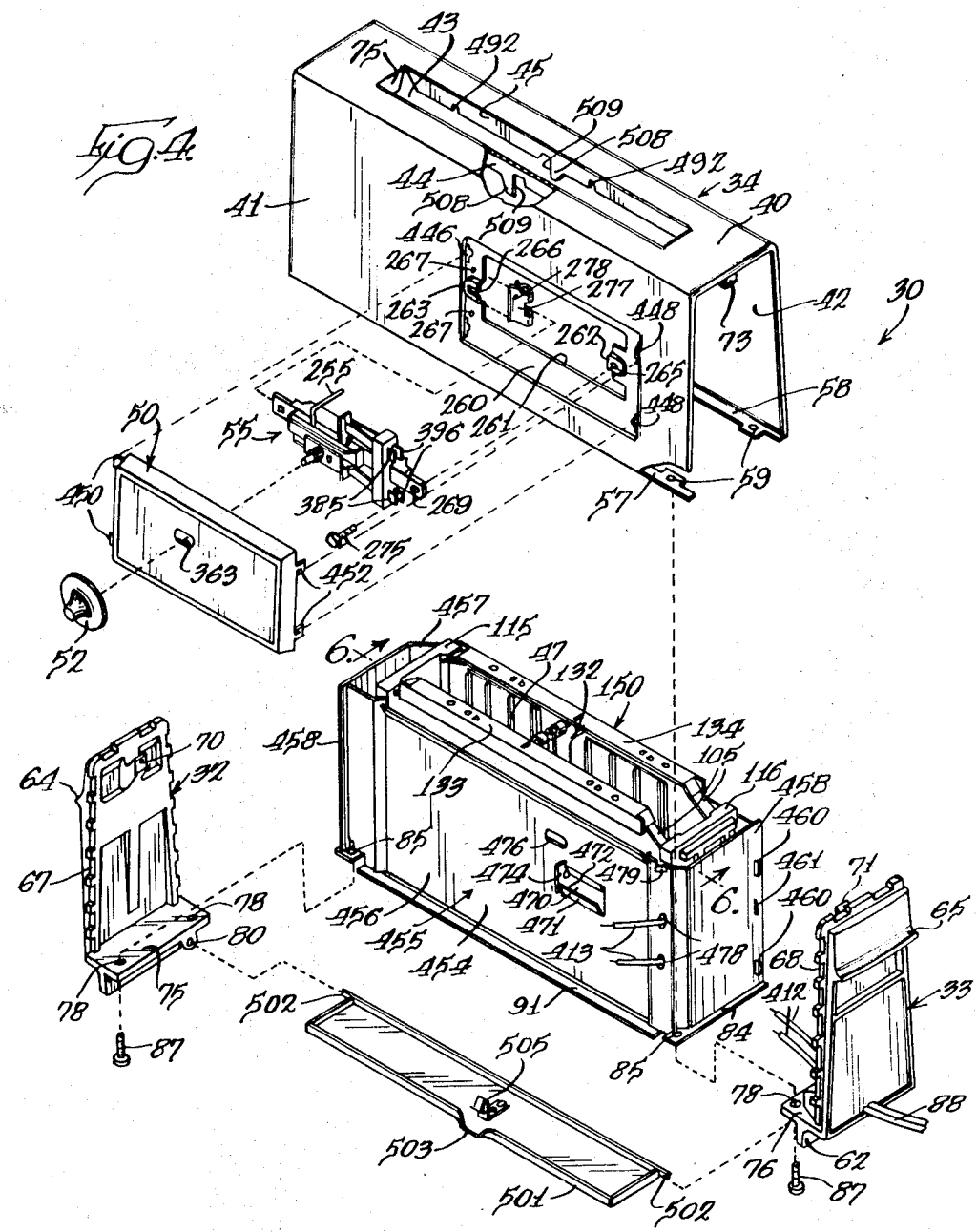

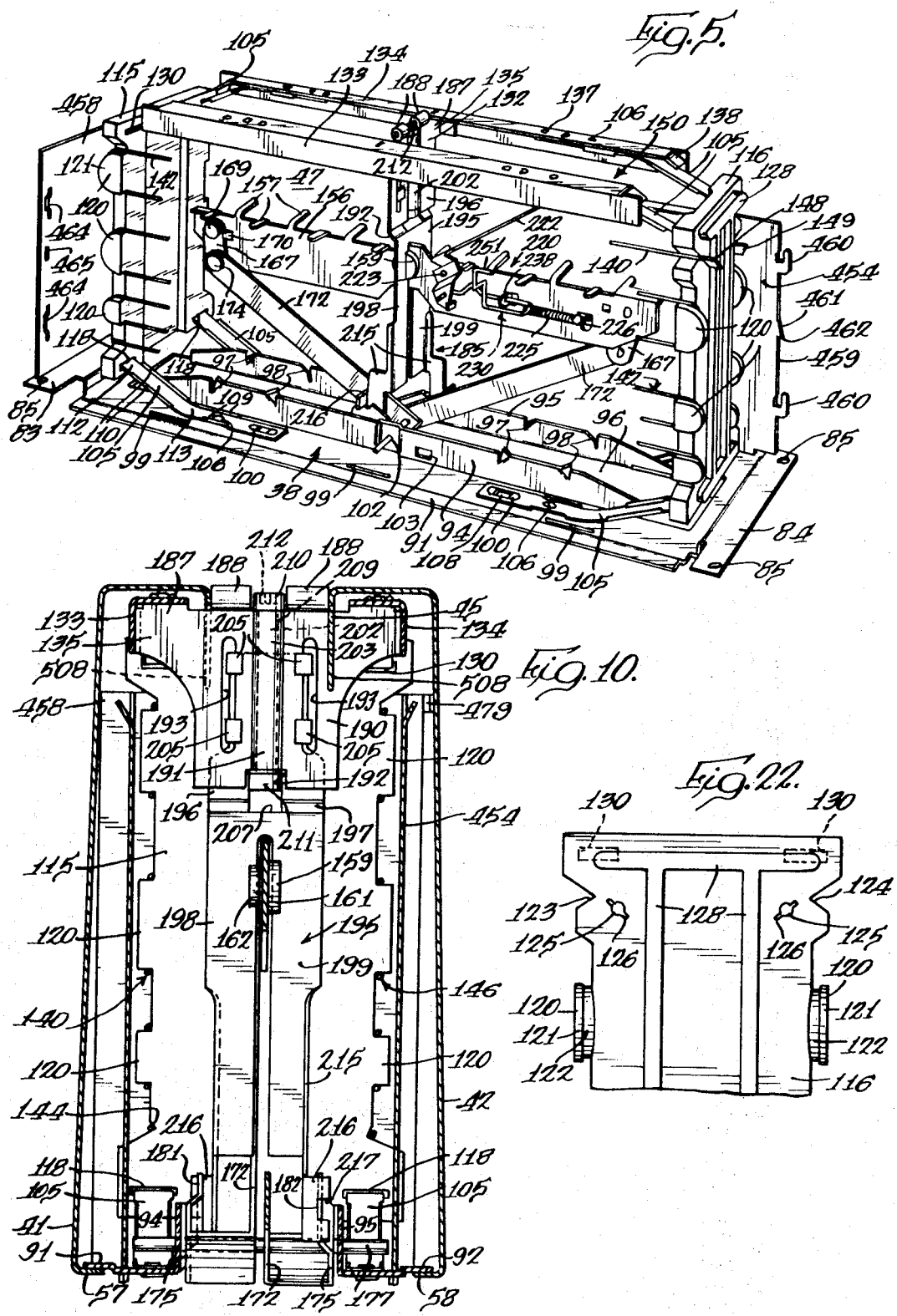

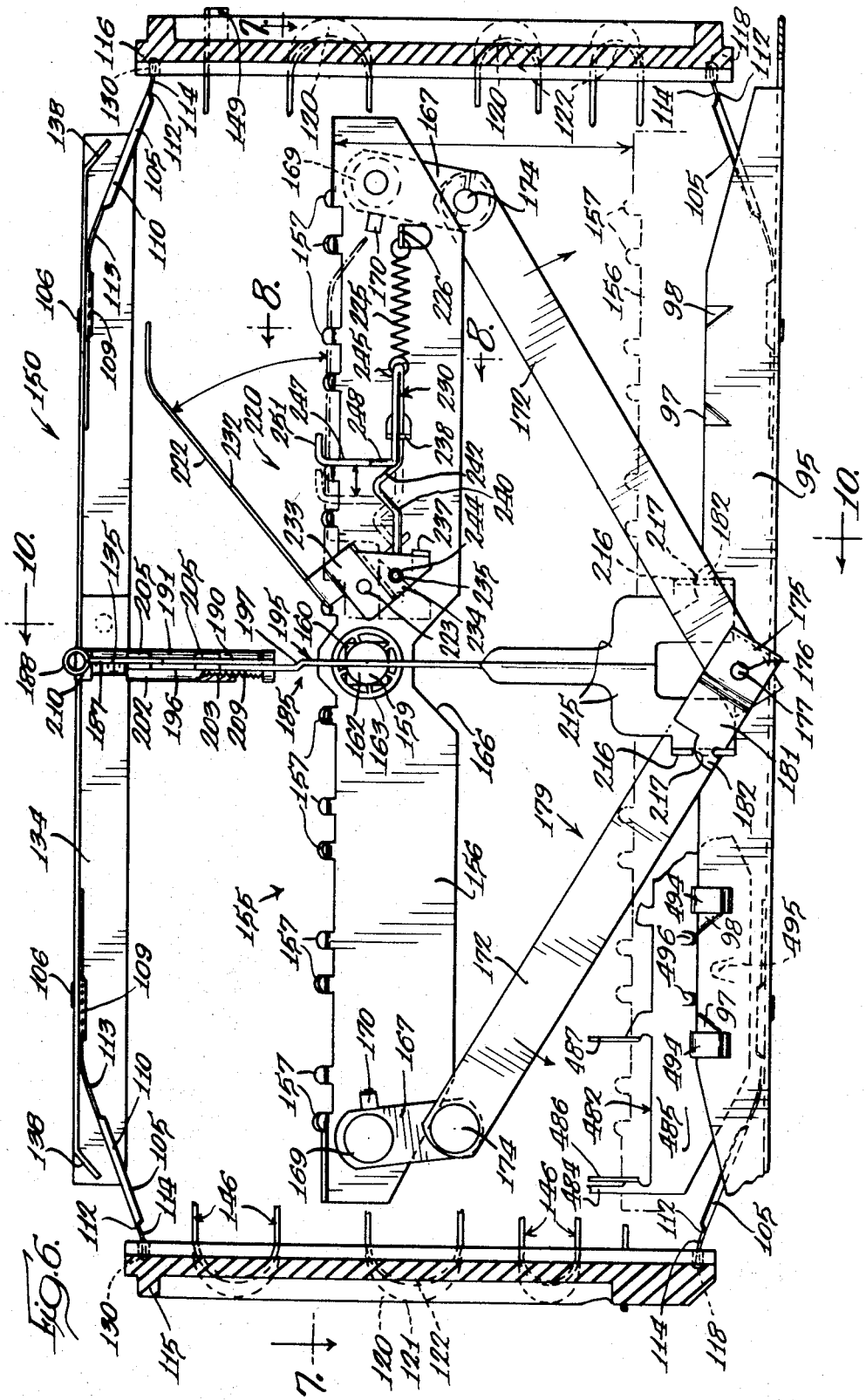

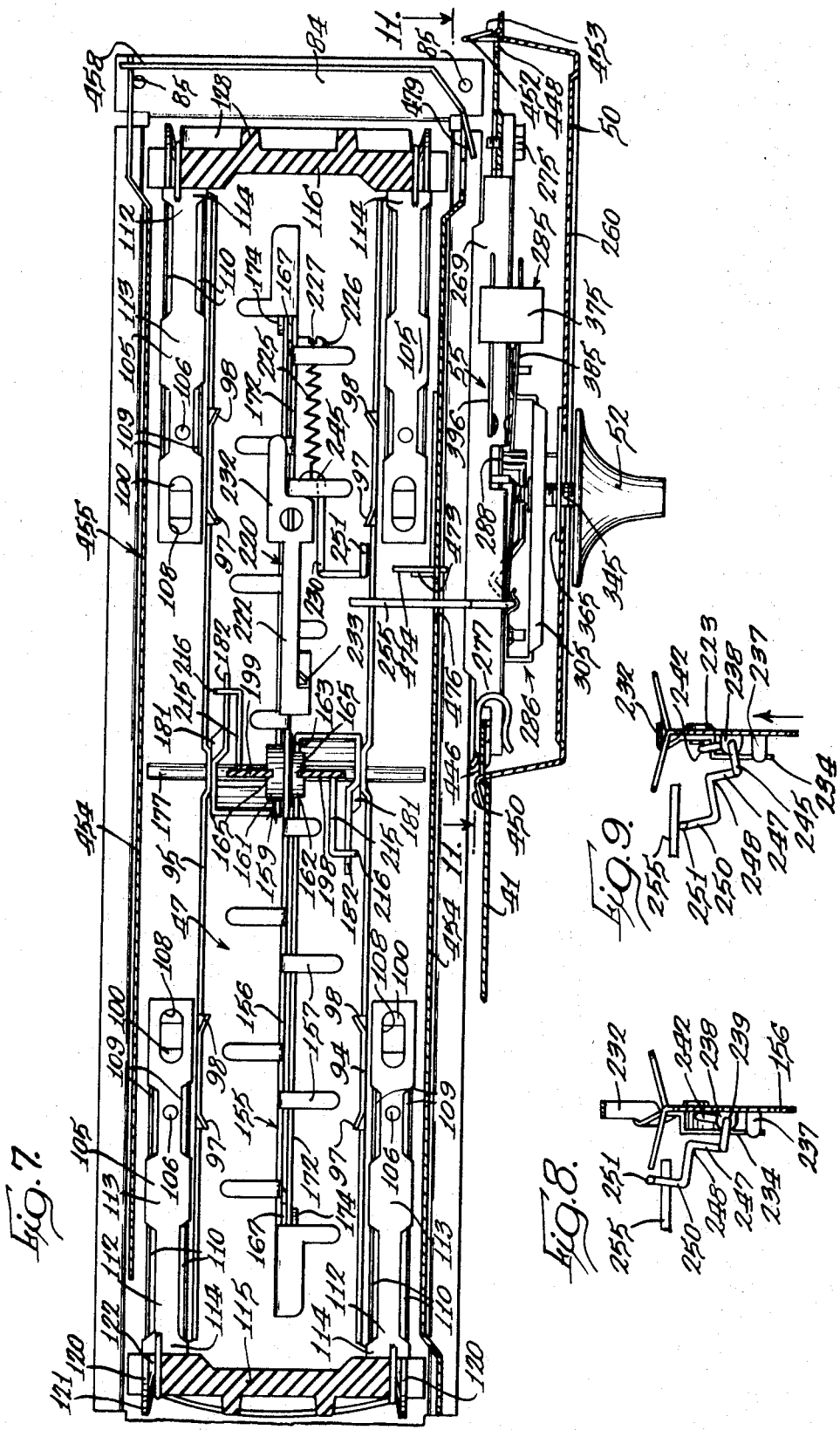

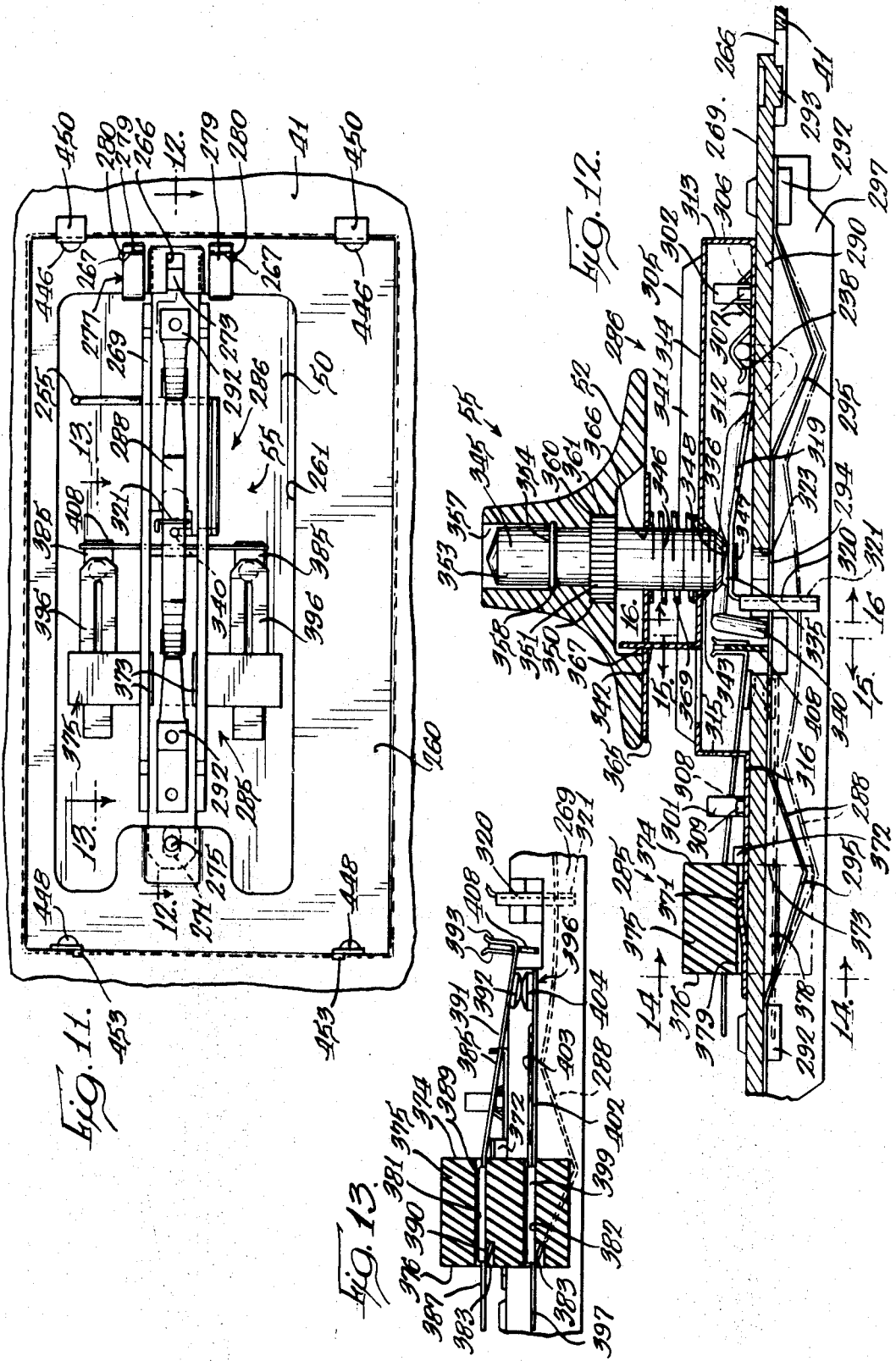

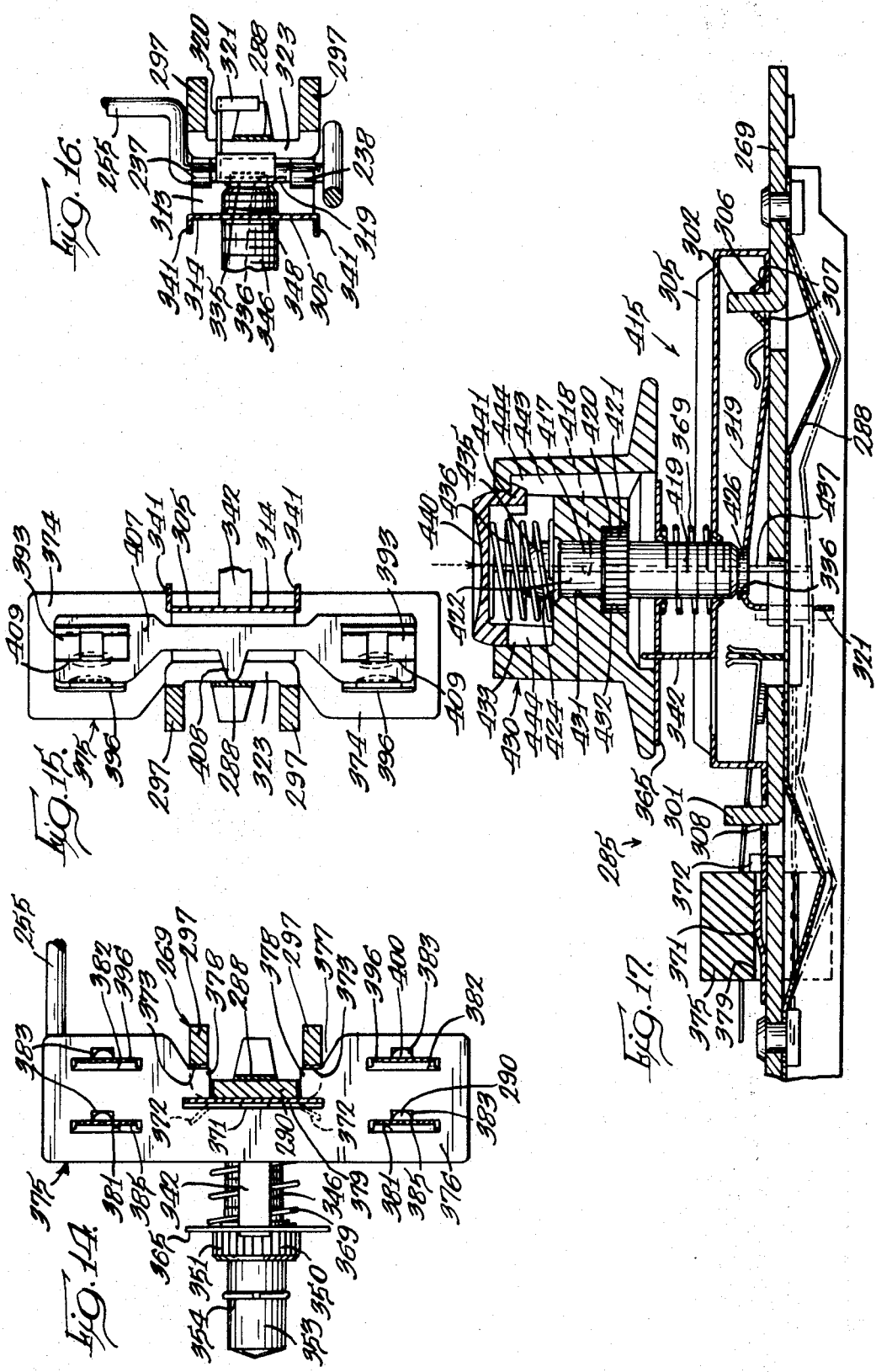

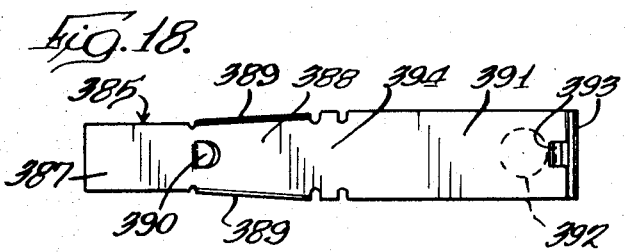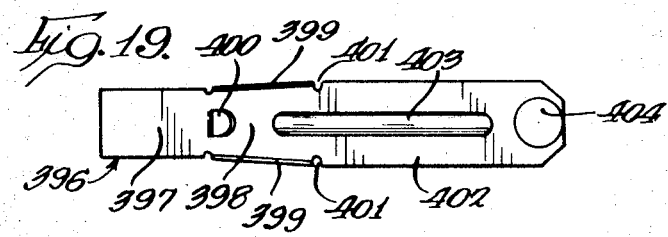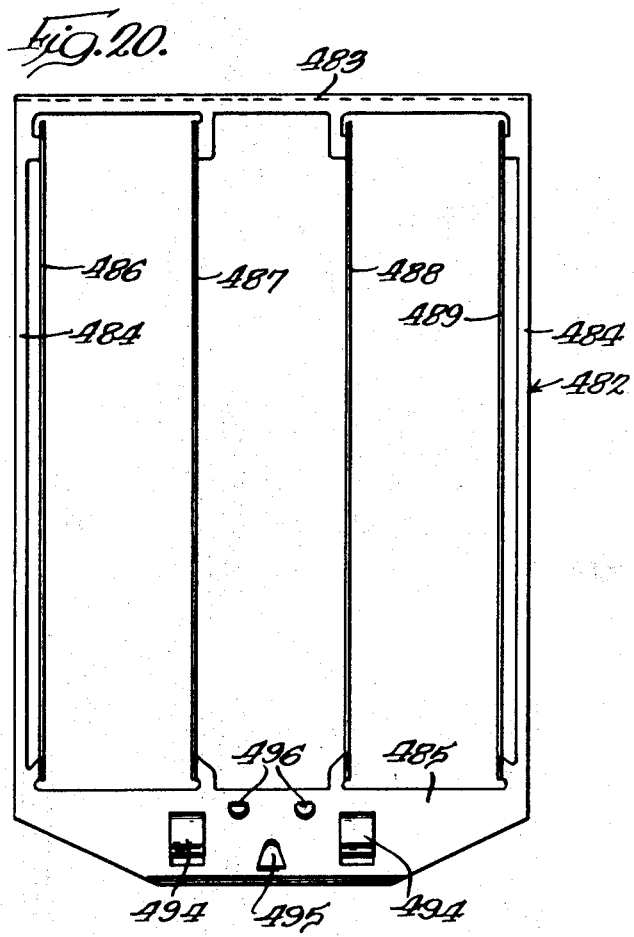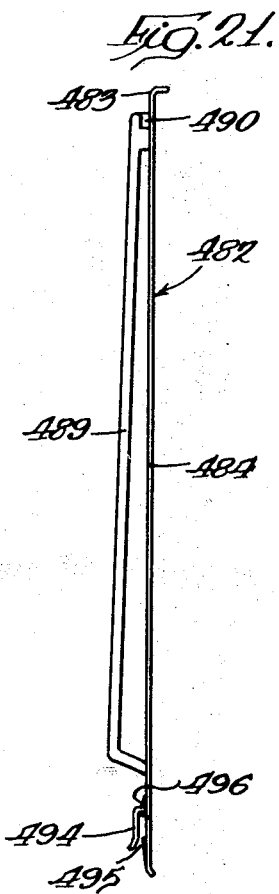

ELECTRIC TOASTER

BACKGROUND OF THE INVENTION

This application is a division of U.S. application Ser. No. 668,597, filed Sept. 18, 1967, now U.S. Pat. No. 3,472,154 which issued Oct. 14, 1969, and is assigned to the same assignee as the instant invention.

One of the most popular electrical appliances found in the kitchen of a home today is the electric toaster. Because it is one of the most frequently used appliances in the kitchen, it normally remains plugged into an electrical outlet and is kept on the countertop instead of being stored with appliances that are not used frequently. Consequently, toasters must be attractively styled due to their continued exposure and use in the kitchen plus the unit should occupy as little of the working space of the kitchen counter as practical.

While four slice toasters have gained in popularity, the most frequently sold toaster is still the two slice unit wherein the bread slices are disposed in spaced parallel relationship necessitating a rather bulky, square housing which consumes considerable working space on the kitchen counter. However, the standard, square design allows considerable space within the toaster for the various components.

The working space of the counter can be conserved by having a longer and much narrower toaster which can fit along the rear edge of the counter which is not normally considered as usable working space. Such a configuration is possible if the toaster is provided with a long, narrow receiving slot for slices of bread which are inserted in an in-line relationship wherein the common edges of the bread are adjacent one another. Moreover, it is necessary for the toaster components to be arranged so that very little width is required. Naturally, the toaster must function equally well or better than the standard shaped toaster where internal space is not a problem.

A desirable feature for a thin toaster is for the selectable control mechanism to be disposed on the side of the toaster shell since the toaster will normally be positioned on the kitchen counter with the relatively long side facing the user. Preferably, the control actuating member or knob should be spaced in some manner from the toaster shell which can become hot during prolonged toaster usage.

In a thinly designed toaster, it is desirable to have as much operating mechanism disposed within the space provided for the toasting chamber as possible in order to permit the toaster to be as thin as practical. That is, the elevator assembly, including the bread carriage and the lifting means, should be located between the toasting heaters defining the toasting chamber. In addition, the power source for operating the elevator assembly should not be located outboard of the heater assembly.

In instances where space is an important consideration, the thermostatic control should be integrated with the switch assembly so that both may be assigned the same location. This design concept also lends itself to lower manufacturing costs. Naturally, the combined thermostatic control and switch assembly should use as few parts as possible and still accurately function, and the parts should be inexpensive to fabricate.

SUMMARY OF THE INVENTION

The invention relates to an electric toaster having an outer shell with a long, narrow slot for receiving slices of bread in an in-line relationship. Disposed within the toaster shell is a narrow elongated toasting chamber located below the bread receiving slot. An electrically insulating member is positioned at each end of the toasting chamber, and electrical resistance wire is wound therebetween to define two toasting heaters spaced on each side of the chamber. In order to support the bread within the toaster, there is provided an elevator assembly including a horizontally extending bread carriage and a lifting mechanism for moving the carriage between an upper bread receiving and withdrawing position and a lower toasting position. Supplying power to the lifting mechanism is a thermal motor including the resistance wire and the insulating support members. In this arrangement, the resistance wire is tightly wound between the members, and the members are movably mounted so that current passing through the wire causes it to expand which, in turn, causes movement of the members. The motion of the thermal motor actuates the lifting mechanism.

Governing the operation of the toasting heaters is a thermostatic control and switch assembly which is mounted on and supported by the toaster shell. The thermostatic control has a trip finger extending into the toasting chamber and is disposed to be acted upon by a reset mechanism mounted on the bread carriage so that the insertion of a slice of bread into the toaster will actuate the toasting cycle, and at the completion of the cycle, the reset mechanism will reset the thermostatic control upon the removal of the toasted bread.

Other novel features of the toaster, as will become apparent from the more detailed description, are the improved means for pivotally mounting the crumb tray and the improved mounting of removable bread guides stamped from sheet metal material.

Accordingly, it is an object of the present invention to provide an improved electric toaster which is easily assembled and inexpensive to manufacture.

It is a further object of the present invention to provide an improved electric toaster arranged for receiving slices of bread in an in-line relationship with a toasting chamber defined by parallel spaced heaters supported by insulating members at each end of the elongated toasting chamber.

It is still a further object of the present invention to provide an electric toaster having improved means for pivotally mounting a crumb tray by utilizing the plastic molded end panels.

It is still another object of the present invention to provide an improved mounting of a thermostatic control to an outer shell of the toaster.

Yet another object of the present invention is to provide a toaster having an improved thermal motor for supplying power to move the bread carriage.

Another object of the present invention is to provide a toaster with an improved thermostatic control governing the toasting operation, and the control being inexpensively and easily manufactured.

Further objects and advantages of the present invention will become apparent as the following description proceeds, and the features of novelty which characterize the invention will be pointed out with particularity in the claims annexed to and forming a part of this specification.

BRIEF DESCRIPTION OF THE DRAWINGS

For a better understanding of the present invention, reference may be had to the accompanying drawings in which:

FIG. 1 is a perspective view of an electric toaster embodying the present invention with a portion of the power cord broken away;

FIG. 2 is an end elevational sectional view taken substantially on line 2–2 of FIG. 1;

FIG. 3 is a side elevational sectional view taken substantially on line 3–3 of FIG. 1 with the power cord deleted;

FIG. 4 is an exploded assembly view of the subject toaster;

FIG. 5 is a perspective view of the thermal motor and elevator assembly with the reflector assembly partially shown;

FIG. 6 is an enlarged, fragmentary, side elevational sectional view taken substantially along line 6–6 of one of the components illustrated in FIG. 4 with the reflector assembly removed;

FIG. 7 is a fragmentary plan sectional view taken substantially on line 7–7 of FIG. 6 showing the electrical resistance wire partially broken away and the bread guides removed;

FIG. 8 is a fragmentary sectional view taken substantially on line 8–8 of FIG. 6 illustrating the reset mechanism with the link disposed alongside of the horizontally extending thermostatic control trip lever and with the reset and trip spring removed;

FIG. 9 is similar to FIG. 8 but with the link positioned below the thermostatic control trip lever which is the normal position of the reset mechanism upon completion of the toasting cycle and after the bread carriage has risen to the upper withdrawing position but before the toast has been removed from the bread carriage;

FIG. 10 is an end elevational sectional view taken substantially on line 10–10 of FIG. 6;

FIG. 11 is a fragmentary elevational view taken substantially on line 11–11 of FIG. 7 illustrating the mounting of the thermostatic control and switch assembly to the toaster shell;

FIG. 12 is a fragmentary plan sectional view taken substantially on line 12–12 of FIG. 11;

FIG. 13 is a fragmentary sectional view taken substantially along line 13–13 of FIG. 11;

FIG. 14 is a fragmentary sectional view taken on line 14–14 of FIG. 12;

FIG. 15 is a fragmentary sectional view taken substantially on line 15–15 of FIG. 12;

FIG. 16 is a fragmentary sectional view taken substantially on line 16–16 of FIG. 12;

FIG. 17 is a fragmentary sectional view similar to FIG. 12 but illustrating another embodiment of the thermostatic control and switch assembly;

FIGS. 18 and 19 are top plan views of the movable and stationary switch contact blades, respectively;

FIGS. 20 and 21 are a front and side elevational view, respectively, of one bread guide; and FIG. 22 is a fragmentary elevational view of the upper portion of the right electrical insulating member without the resistance wire and terminals assembled thereto.

DESCRIPTION OF THE PREFERRED EMBODIMENTS

Referring now to the drawings, there is illustrated a new and improved electric toaster constructed in accordance with the features of the present invention and referred to generally by the reference numeral 30. This toaster 30 includes an outer enclosure or housing defined by a pair of opposite end panels 32 and 33, an outer shell 34 of U-shaped cross section and a base 38. The shell 34 comprises a top wall 40 and two side walls 41 and 42.

The top shell wall 40 is provided with an elongated bread receiving slot 43 defined, in part, by downwardly bent flanges 44 and 45 and forming an entrance to bread toasting chamber 47 which is relatively long and narrow and located beneath the slot. Mounted on side shell wall 41 is control housing 50 bearing printed indicia 51, which is disposed on said housing, a color control knob 52 having a pointing dot 53 thereon so that the user may selectively rotate the knob in order to obtain a given degree of toasting. Enclosed within the control housing 50 and mounted on and supported by side shell wall 41 is a thermostatic control and switch assembly 55 described hereinafter in detail. The bottom edges of shell side walls 41 and 42 are bent inwardly to form longitudinally extending flanges 57 and 58 for adding rigidity to the shell and for mounting purposes. Each of the shell flanges 57 and 58 are formed with suitable mounting holes 59.

The end panels 32 and 33 are preferably constructed of molded plastic material such as phenolic resin or the like and are provided wtih lower depending portions 61 and 62, respectively, defining legs for supporting the toaster on a table or kitchen counter top. The outer faces of end panels 32 and 33 may be provided with integrally molded features such as projecting flanges 64 and 65 to serve as heat insulated handles for transporting the toaster 30. Moreover, each end panel 32 and 33 is integrally formed with a notched periphery or edge 67 and 68 adapted to be inserted inside of the outer shell 34 at its ends which are slightly bent inwardly with an inwardly extending U-shaped rib 70 and 71 which are adapted to cooperate with clips 73 welded to a depending flap 74 of shell top wall 40 adjacent the ends of slot 43 for securely holding the end panels to the shell and with inwardly extending floor portions 75 and 76 having vertical holes 78 which, when the end panels are assembled to the shell, are in alignment with shell flange holes 59. For a purpose to be discussed hereinafter, end panels 32 and 33 are molded with opposed horizontally extending recesses 80 and 81, respectively, in the floor portions 75 and 76.

Positioned at the bottom of toaster 30 is base 38 having raised end portions 83 and 84, each of which has a plurality of mounting holes 85. When the shell 34, end panels 32 and 33 and base 38 are in assembled relationship, the base end portions 83 and 84 rest on the end panel floor portions 75 and 76, and a plurality of threaded fastening members 87 pass through the shell mounting holes 59, end panel floor portion holes 78 and base end portion holes 85 whereby the assemblage is rigidly held together with the use of a minimum number of fasteners and, consequently, it may be readily disassembled. For providing power to the toaster 30, an electrical cord 88 enters into and is locked to end panel 33.

Preferably, base 38 is fabricated integrally from sheet metal material and includes longitudinally extending side runners 91 and 92 which are adapted when assembled within the toaster to rest on shell flanges 57 and 58, respectively, as can be seen in FIGS. 4, 5 and 10. The base 38 is formed with upturned flanges 94 and 95 running longitudinally and defining an elongated opening 96 which is in vertical alignment with toasting chamber 47 and shell bread receiving slot 43. Along base flanges 94 and 95 are a plurality of pairs of abutments, each of which consists of an abutment flap 97 and 98. The abutment flaps are bent inwardly towards opening 96 and are formed so that the points of flaps 97 are facing in the opposite direction from the points of flaps 98. Also formed in base 38 are a plurality of locking slots 99 and oval shaped projections 100. Lastly, the base 38 is stamped with a hole 102 extending transversely through both base flanges 94 and 95 and crumb tray locking openings 103 located in the base flanges 94 and 95.

For the purpose of mounting a heater assembly within the toaster 30, four truss springs 105, preferably formed from resilient material, are riveted to the base 38 by rivets 106 so that the free ends 112 thereof are slightly upwardly inclined. Each of the truss springs 105 is formed with an oval opening 108 into which the oval-shaped base projections 100 extend in order that the truss springs may be properly oriented. Therefore, four truss springs 105 are rigidly held to base 38 with their free ends 112 extending toward the opposite ends of the base as may be seen in FIG. 6. Moreover, the truss spring 105 is formed with upturned edges 109 on each side thereof adjacent to rivet 106, and spaced therefrom are upturned edges 110 which stop short of free end 112. Obviously, those portions of the truss spring having upturned edges are more rigid than those portions without the upturned edges. Consequently, if a bending moment is imposed on truss spring 105, the portions between upturned edges 109 and 110 would do the majority of the bending and may be considered as pivot areas 113.

Located near each end of the toasting chamber 47 and partially supported by truss springs 105 are vertically extending electrically insulating members 115 and 116, both of which are preferably fabricated from a ceramic material such as alumina. Near the bottom of insulating members 115 and 116 are formed relatively large recesses 118 into which truss spring ends 112 extend with considerable clearance so that the spring ends can pivot within the recesses to define a pivotal connection 114. Vertically spaced along the sides of insulating members 115 and 116 are a plurality of L-shaped ears 120 which are relatively thick and have their free leg 121 facing away from the toasting chamber 47 and the other leg 122 joining to the insulating members. The end portion of each leg 121 and the outer portion of leg 122 are rounded. As can be seen in FIG. 22, insulating member 116 is formed with a starting slot 123 along one edge near the top and a finishing slot 124 along the opposite side thereof near the top. Adjacent to slots 123 and 124 are locking cavities 125 having a circular shape with opposed extending slot portions 126. For the purpose of increasing the structural integrity of the insulating members 115 and 116, each has a strengthening rib 128 on the surface facing away from the toasting chamber 47. Near the top of each insulating member are formed a pair of relatively large supporting recesses 130.

Assisting in holding the insulating members 115 and 116 in their proper position is upper truss assembly 132 including two oppositely disposed identical trusses 133 and 134 and a T-shaped crosspiece 135 which is rigidly attached to trusses 133 and 134 by staking and welding. Each truss 133 and 134 has an L-shaped cross section and is formed with a plurality of oval shaped projections 137 which are identical to projections 100 on base 38 and downwardly angled limiting flaps 138 located at each end thereof for preventing the truss assembly 132 from ever springing downwardly over center. Two truss springs 105 are riveted to each truss 133 and 134 by rivets 106 whereby the truss spring free ends 112 extend outwardly away from toasting chamber 47 and into insulating member upper recesses 130 with considerable clearance to define pivotal connection 114. As may be seen in FIGS. 3, 5 and 6, the truss springs 105 acting upon insulating members 115 and 116 tend to bias the upper truss assembly 132 downwardly and the insulating members outwardly away from the toasting chamber 47.

In order to restrain and bias the insulating member 115 and 116 inwardly towards toasting chamber 47 and to constitute heaters for accomplishing the toasting operation, electric resistance wire 140 is looped back and forth between insulating members 115 and 116 passing around insulating member ear legs 122 so that the wire convolutions formed running between common sides or opposed edges of the insulating members constitute a first heater 142 lying in a substantially vertical plane and adjacent to one side of the elongated toasting chamber 47. The resistance wire 140 upon reaching the bottom of insulating member 115 is fed along a slot 144 formed in said member and extends across the backed face thereof whereupon it is looped back and forth between the opposite common sides or opposed edges of the insulating members 115 and 116 to form a plurality of convolutions which constitute a second heater 146 which is spaced and parallel to the first heater 142 with the toasting chamber 47 located therebetween. Each heater has the wire convolutions spaced closer together near the bottom in order to uniformly toast bread. The resistance wire 140 is tightly wound when at room temperature between the insulting members 115 and 116 in such a manner as to bias the insulating members inwardly and thereby subject the truss springs 105 to stress so that the truss springs 105 are working against the tension of resistance wire 140. Inasmuch as the resistance wire 140 is under considerable tension, one end of the resistance wire is welded to a spade-shaped terminal 148 which is securely locked into cavity 125 by the edges of the terminal engaging into the slot portions 126 so that the wire at this end passes through starting slot 123. Correspondingly, the opposite end of resistance wire 140 is rigidly held to insulating member 116 and the wire is positioned in finishing slot 124 by this end being welded to spade-shaped terminal 149 which extends into locking cavity 125 with the edges thereof nested into slot portions 126.

It should be appreciated that the first heater 142 and the second heater 146 are designed in such a manner as to be a part of a thermal motor 150 consisting of the base 38, insulating members 115 and 116, upper truss assembly 132 and resistance wire 140. The thermal motor 150 is designed so that the upper truss assembly 132 is capable of vertical movement. When an electrical potential is imposed across terminals 148 and 149, the current passing through resistance wire 140 causes it to lengthen due to thermal expansion, and the truss springs 105 bias the upper truss assembly 132 downwardly towards base 38. Similarly, when the electrical potential is removed from terminals 148 and 149, the resistance wire 140 cools and contracts pulling the insulating members 115 and 116 towards each other and thereby causing the upper truss assembly 132 to move upwardly. It should also be appreciated from the discussion concerning the truss spring 105 that the pivotal movement of truss springs 105 allowing the insulating members 115 and 116 to move outwardly and inwardly takes place mostly at truss spring pivotal areas 113 and 114. Consequently, truss springs 105 not only act as pivotal linkage, but also biases the insulating members outwardly.

In order to support and transport slices of bread within the toaster 30, there is provided an elevator assembly 155 including a bread carriage 156 which is disposed for vertical movement in the toasting chamber 47 between first heater 142 and second heater 146. At the start of a toasting cycle, the bread carriage 156 is at an upper bread receiving and withdrawing position as illustrated in FIGS. 3 and 6. The bread carriage is capable of vertical movement and can move to a lower or toasting position which is illustrated in broken lines in FIG. 6. In the lower position, the bread supported on carriage 156 is disposed between heaters 142 and 146 for toasting. When the bread carriage 156 returns to the upper position, the slices of bread project a sufficient distance through shell bread slot 43 so that the user may conveniently withdraw the toasted bread from the toaster 30. Preferably, the bread carriage 156 is formed from sheet material and is sufficiently long to span most of the distance between the insulating members 115 and 116. In order to support slices of bread on the bread carriage 156, it is formed with a plurality of transversely extending fingers 157. Guiding the vertical movement of bread carriage 156 is bearing 159 which is mounted to the carriage at its approximate midpoint and extends through a square carriage opening 160. Preferably, the bearing 159 is fabricated from a material which is not adversely effected by high temperature and is relatively smooth such as a glass filled Teflon insulator material. Bearing 159 has a large diameter 161 at one end and a smaller diameter end 162 which extends through the bread carriage opening 160. Securing the bearing 159 to the bread carriage 156 is a spring retainer 163 which is in locking engagement with the small diameter end 162. Both ends of bearing 159 are formed with a vertically extending slot 165 as may be seen in FIG. 7. Immediately below bearing 159, the bread carriage 156 has a cut out portion 166 which provides clearance permitting the bread carriage to be lowered to the toasting position. Pivotally secured to each end of bread carriage 156 by means of shoulder rivets 169 are tie bars 167 which are oppositely oriented so that they are secured to opposite sides of the bread carriage. Limiting the pivotal movement of tie bars 167 are laterally extending abutments 170 which are integrally formed with the bread carriage. Consequently, the tie bars 167 may freely rotate towards the ends of the bread carriage 156 but are permitted limited rotational movement toward the center due to abutments 170. Pivotally connected to each tie bar 167 is a J-shaped lifter arm 172 by means of shoulder rivets 174. The hook ends 175 of lifter arms 172 are formed with in-line openings 176 through which an axle 177 extends and also passes through base flange holes 102. In this manner, lifter arms 172 are pivotally connected to the base 38 at approximately the midpoint of toaster chamber 47. Tie bars 167 and lifter arms 172 constitute a linkage assembly 179 which connects the bread carriage 156 to the base 38. Therefore, the linkage assembly 179 supports the bread carriage 156 permitting it to move from the upper bread receiving position to the lower toasting position by the lifter arms 172 pivoting downwardly while the tie bars 167 pivot outwardly. As may be seen in FIG. 6, the bread carriage 156 when in the lower position receives axle 177 in the cut out portion 166 whereby the bread carriage is permitted considerable vertical movement within a rather limited space. Furthermore, it should be appreciated that the bread carriage 156 and the linkage assembly 179 are essentially disposed within the confines of the toasting chamber 47 thereby allowing the toaster to be relatively thin. It should be apparent that the bread carriage abutment 170 prevents the tie bars 167 from ever rotating inwardly so that the lifter arms 172 would pivot upwardly against the bread carriage fingers 157. Thus, the linkage 179 can never be swung past the abutment 170 causing the linkage assembly to be inoperative.

As may be seen in FIGS. 6 and 7, the lifter arm hook end 175 includes short leg 181 which is recessed inwardly and contains a downwardly bent projection 182. Naturally, if a vertical force were exerted upon the downwardly bent portion 182, the linkage assembly 179 would cause the bread carriage 156 to move downwardly. Moreover, since the downwardly bent portion 182 is far closer to axle 177 on which lifter arm 172 rotates than the distance between the axle and the connection of the lifter arm 172 to the tie bar 176, a very small vertical movement of projection 182 causes a far greater vertical movement of the bread carriage.

Providing power transmission between thermal motor 150 and linkage assembly 179 is a driver assembly generally referred to by reference numeral 185 which extends vertically through the center of the toasting chamber 47 from the upper truss assembly 132 to the linkage assembly. As indicated hereinbefore, the upper truss assembly 132 includes a T-shaped cross piece 135 which is securely attached to trusses 133 and 134. The cross piece 135, as may be seen in FIG. 10, includes an upper horizontal leg 187, the ends of which are securely attached to trusses 133 and 134. Along the upper edge of leg 187 are spaced two circular projections 188. Extending downwardly from the upper horizontal leg 187 is a vertical leg 190 having a semicircular groove 191 extending vertically from between circular projections 188, a notched portion 192 located at the bottom end of vertical groove 191 and two spaced vertically extending slots 193, one of which is disposed on each side of the vertical groove 191.

Cooperating with and secured to cross piece 135 is a vertically extending driver 195 having an upper portion 196, and recessed therefrom at shoulder 197 are two spaced legs 198 and 199. As may be conveniently seen in FIGS. 5 and 10, the driver upper portion 196 includes a vertically extending groove 202 having formed on its concave surface threads 203, a pair of laterally extending projections 205 which extend through cross piece slots 193 and are bent over locking the driver 195 in vertical sliding relationship with cross piece 135 and a rectangular opening 207. When the driver 195 is assembled to the cross piece 135, the cross piece vertical groove 191 and the driver vertical groove 202 cooperate to define a vertically extending circular opening through which tension adjustment screw 209 is positioned. As may be seen in FIG. 10, the adjustment screw 209 has an enlarged upper head 210 disposed between cross piece circular projections 188 and an enlarged lower head 211 positioned in cross piece notched portion 192 and also disposed within driver rectangular opening 207. To facilitate the rotational movement of adjustment screw 209, enlarged upper head 210 is fabricated with a driving socket opening 212. As is evident from the relationship between the cross piece 135, the driver assembly including driver 195 and threaded adjustment screw 209, the rotation of the adjustment screw changes the relative vertical relationship between the upper truss assembly 132 and the driver 195. That is to say, if the upper truss assembly 132 were to remain stationary, the rotation of adjustment screw 209 in one direction lowers the driver 195 while the rotation in the opposite direction would raise the driver 195 inasmuch as the enlarged heads at the ends of the adjustment screw prevent the screw from moving in a vertical direction with respect to cross piece 135, and the threads on the adjustment screw engage with the driver threads 203 causing movement of the driver.

To relate the vertical movement of upper truss assembly 132 to the linkage mechanism 179, the driver legs 198 and 199 each have a bent flange portion 215 extending parallel to the elongated toasting chamber 47, and these portions each have an outwardly bent tab 216 containing a driving notch 217 adapted to receive the lifter arm bent projection 182. As can best be seen in FIGS. 6 and 10, the downward movement of driver 195 exerts a downward force on lifter arm bent portion 182 causing the lifter arm to pivot downwardly and thereby causing the bread carriage 156 to move downwardly. In order that the bread carriage 156 will always be properly positioned horizontally, the bearing 159 is disposed between the driver legs 198 and 199 whereby the bearing slots 165 are in operative sliding engagement with the legs. Therefore, the bearing 159 prevents longitudinal and transverse movement of the bread carriage. Moreover, it should be appreciated that a high multiplication of the downward movement of the upper truss assembly 132 is obtained by the linkage assembly 179 being pivotally connected to the ends of the bread carriage 156. An additional benefit of attaching the linkage assembly 179 to the ends of the bread carriage 156 is that this relationship also tends to maintain the bread carriage in a level or horizontal position.

From the description, it should be apparent that the thermal motor 150 supplies the power through driver assembly 185 for actuating the bread carriage 156 by means of the linkage assembly 179. At the start of a toasting cycle, the bread carriage 156 is at the upper bread receiving position. Upon energizing the toaster heaters 142 and 146, the resistance wire 140 expands allowing the truss springs 105 to move the insulating members 115 and 116 outwardly and causing the upper truss assembly to move downwardly. The downward motion of the truss assembly is transmitted through the driver assembly 185 at its connection with the linkage assembly for causing the bread carriage 156 to assume the lower toasting position. After the completion of the toasting cycle, the heaters are deenergized, and consequently, the resistance wire 140 contracts drawing the insulating members inwardly forcing the upper truss assembly and the driver assembly to move upwardly which, in turn, causes the bread carriage to move upwardly due to upwardly movement of the driver assembly and the pivotal movement of the linkage assembly 179. The adjustment screw 209 can be used to change the vertical location of driver 195 to change the tension in the resistance wire 140. Inasmuch as the driver assembly, the elevator assembly and the linkage assembly are disposed essentially within the toasting chamber 47, the toaster shell 34 may be made exceedingly thin.

The preferred embodiment of the applicant's toaster illustrated in the drawings is fully automatic whereby the user merely has to insert a slice of bread into the toaster shell slot 45 and rest the bread upon the carriage 156, and the toaster automatically lowers the bread to the toasting position, toasts the bread and thereafter raises the bread to the upper withdrawing position. The toasting of the slice of bread is controlled by the thermostatic control and switch assembly 55. With this construction, it is necessary that means be provided for actuating the thermostatic control and switch assembly 55 upon the insertion of a slice of bread onto carriage 156, and the withdrawal of the bread from the carriage causes the thermostatic control and switch assembly to be reset. In order to accomplish this objective, there is provided a reset and trip mechanism 220 mounted to the bread carriage 156. As may be seen in FIG. 6, the reset and trip mechanism 220 includes a trigger 222 pivotally mounted to the bread carriage by shoulder rivet 223, tension spring 225 attached at one end to an integral tab 226 including a spring receiving notch 227 struck from the bread carriage 156 and a link 230 which interconnects the trigger 222 and tension spring 225. The trigger 222 is disposed in the toasting chamber 47 so as to be engageable with a slice of bread inserted into the half of the toasting chamber disposed between the driver 185 and insulator 116. When there is no bread positioned on the carriage 156, the trigger 222 is biased upwardly by tension spring 225 so that it assumes the position illustrated in FIG. 6. The trigger 222 includes arm portion 232 which is adapted to be engaged by bread inserted into the toasting chamber, a central portion 233 through which rivet 223 pivotally supports the trigger and an offset end portion 234 containing an opening 235 therein. Limiting the pivotal movement of trigger 222 is tab 237 struck from the bread carriage 156. Link 230 is held to the bread carriage 156 by tab 238 struck therefrom and containing an opening 239 through which a link center portion 240 extends whereby the link may move longitudinally with respect to bread carriage 156 and may also pivot about the tab opening 239. To limit the pivotal movement of the link, the link center portion 240 is formed with a V-shaped extension 242 disposed to abut against the bread carriage 156. Before attaching spring 225 to the tab receiving notch 227, the spring is rotated sufficiently so that after assembly, it will exert a torsional force biasing the link 230 to pivot the link extension 242 against the bread carriage. The link 230 includes a bent end 244 adapted to pass through trigger opening 235 so that the trigger 222 and the link 230 are connected together and the opening 235 is sufficiently larger than the portion of bent end 244 extending therethrough to permit the link to pivot without binding with the trigger. In addition, the link 230 has a U-shaped section 245 to which extension spring 225 is attached and an actuator end 247 having an angular portion 248 extending upwardly parallel to bread carriage 156 and outwardly from the bread carriage, an outer upright portion 250 and a horizontal portion 251 which extends parallel to the longitudinal direction of the bread carriage and back towards the spring 225.

In discussing the operation of reset and trip mechanism 220, it is necessary to understand that the thermostatic control and switch assembly 55 contains a trip lever 255 extending horizontally into the toasting chamber as disclosed in FIG. 7. When viewing the trip lever 255, it should be realized that when it is pivoted as seen in FIG. 7 towards insulator 115 that it closes a switch to energize the heaters 142 and 146. In addition, the pivoting of lever 255 towards insulator 115 resets the thermostatic control so that it is disposed to sense the surface temperature of the bread being toasted. Without a slice of bread on carriage 156, the reset and trip mechanism and thermostatic control trip lever are as illustrated in FIG. 8. In operation, the insertion of a slice of bread on top of trigger 222 causes it to pivot downwardly and thereby slides link 230 towards trip lever 255 until the link outer upright portion 250 pivots it sufficiently to reset the thermostat and close the switch. As indicated previously, once the heaters are energized, the bread carriage is lowered to the toasting position. After the toast has reached a desired color, the thermostat opens the electrical circuit causing the thermal motor 150 to raise the bread carriage to the bread withdrawal position. Since the slice of bread is still on top of the trigger 222 when the bread carriage moves to the upper position, the link is still in a position to engage trip lever 255. Inasmuch as the link comes up underneath the trip lever 255, the link horizontal portion 251 strikes against the trip lever 255 causing the link to rotate downwardly as indicated in FIG. 9. As soon as the bread is removed from the bread carriage, the tension spring 225 biases the trigger 222 upwardly forcing link 230 to slide towards insulator 116. As soon as the link horizontal portion 251 clears the trip lever 255, the tension spring 225, due to its torsional preloading, rotates the link until the link V-shaped extension 242 abuts against the bread carriage 156. Thus, the outer upright portion 250 of the link 230 is once again in alignment, as shown in FIG. 8, to actuate the trip lever 255 upon the insertion of another slice of bread. It should be appreciated that the reset and trip mechanism is very simply constructed and operated. The mechanism is inexpensively manufactured since it consists of four basic parts, namely, trigger 222, link 230, shoulder rivet 223 and a simple tension spring 225. Of these parts, the trigger 222 is inexpensively formed from sheet material, and the link 230 is inexpensively processed from coiled wire.

Controlling the operation of the toasting cycle is the thermostatic control and switch assembly 55 which is mounted to the toaster outer shell side wall 41. As may be seen in FIG. 4, the side shell wall 41 is formed with a depressed area 260 including an elongated opening 261 extending horizontally. The depressed area 260 also includes a raised mounting area 262 positioned at one side of the opening 261 and another raised mounting area 263 disposed at the opposite end of the opening 261. Mounting area 262 contains a hole 265 while the mounting area 263 has a horizontally extending slot 266. On each side of mounting area 263 is a relatively small locking hole 267. The thermostatic control and switch assembly 55 includes a rigid, relatively thick, channel-shaped frame 269 which is preferably fabricated from a material which readily conducts heat such as aluminum. The elongated frame 269 has an elongated hole 271 located near one end and at the other end, has a rectangularly shaped projection 273. As may be seen in FIG. 11, the thermostatic control and switch assembly 55 is horizontally disposed in the shell side opening 261 with the frame elongated hole 271 in alignment with mounting area hole 265 while the frame rectangularly shaped projection 273 is disposed within the mounting area slot 266. A thread cutting screw 275 passes through frame elongated hole 271 and into threaded engagement with mounting area hole 265 thereby locking one end of the frame rigidly to mounting area 262. It should be appreciated that the elongated frame opening 271 permits a variation in the horizontal locking position of the frame 269 to compensate for assembly tolerances. At the other end of frame 269 as shown in FIG. 4, the rectangularly shaped projection 273 is locked into slot 266 by means of a resilient U-shaped mounting clip 277 having a central cross portion 278 and two U-shaped spaced legs 279 formed with an inwardly pointing barb 280. Once the frame 269 has been placed in its proper position so that the frame projection 273 is in slot 266, the U-shaped mounting clip 277 can easily be inserted so that the frame is disposed between the two legs 279 and the clip pushed to its locking position so that the legs are clamped against the depressed area 260 adjacent to the mounting area 263 whereby the barbs 280 are snapped into engagement with locking holes 267. Thus, with this single mounting clip, one end of frame 269 is securely mounted to area 263. However, it should be appreciated that the resilient mounting clip 277 does not prevent the frame projection 273 from moving longitudinally within slot 266. In addition, both the thread cutting screw 275 and the clip 277 urge the frame 269 into intimate heat transmitting relationship with the shell wall 41. During the toasting operation, the outer shell 34 remains relatively cool with respect to the internal components, and consequently, the heat which is transferred to the frame 269 may be dissipated to the shell 34 in order to maintain the frame 269 at a relatively cool temperature. In this manner, the outer shell 34 can be considered to be a cold sink for the thermostatic control and switch assembly 55. The mounting of the thermostatic control and switch assembly 55 to the outer shell 34 is accomplished in such manner to compensate for the difference in thermal expansion between frame 269 and the outer shell 34. Preferably, the outer shell 34 is fabricated from sheet steel and thereafter plated. Considering that the outer shell 34 remains at a cooler temperature during the toasting cycle than frame 269 and that the frame has a higher coefficient of thermal expansion than the shell, the present mounting arrangement allows the frame to expand at a faster rate than the shell so that no stresses are imposed on the thermostatic control and switch assembly 55. That is to say, as the frame 269 expands at a faster rate than the shell 34, the rectangularly shaped projection 273 is permitted to slide in slot 266 inasmuch as the other end of the frame is fixedly attached to the shell by means of screw 275. Correspondingly, as the frame 269 cools, the frame again is permitted to move with respect to the shell 34.

At this juncture, the operation and structure of thermostatic control and switch assembly 55 will be examined. The thermostatic control and switch assembly 55 includes a switch assembly 285 and a thermostatic control 286. As indicated hereinabove, the thermostatic control 286 has an elongated channel-shaped frame 269, and disposed therein is an elongated bimetallic heat responsive element 288 which is rigidly attached near its ends to a bight portion 290 of frame 269 by means of two spaced square headed rivets 292. The heat responsive element 288 is provided with a central portion 294 disposed between two V-shaped portions 295. The operation of this type of a heat responsive element is well known in the art, and the theory of operation will not be discussed herein. Suffice it to say that the heat responsive element 288 has a heat sensing position which is indicated in broken lines in FIG.

12 and an inactive position illustrated in solid lines in FIG. 12. When the heat responsive element reaches a determined temperature, it snaps inwardly toward the frame bight portion 290. The frame 269 is formed with two spaced upright flange portions 297 which extend longitudinally adding rigidity to the frame and shielding the heat responsive element from side radiant energy along with increasing the mass of the frame to increase its effectiveness as a cold sink. Two integral locking lugs 301 and 302 are bent upwardly from the frame bight portion 290.

A multipurpose mounting bracket 305 is a unitary piece formed by stamping from sheet metal and is mounted to the back side of frame bight portion 290 by lug 302 projecting through an opening 306 having four locking fingers 307 spaced at right angles for preventing motion in any direction and lug 301 projecting through opening 308 having oppositely disposed, transversely extending locking fingers 309 for preventing transverse movement. The mounting bracket 305 comprises generally a first horizontal portion 312 which contains hole 306, a first upright portion 313, a second horizontal portion 314 which is spaced above the first horizontal portion 313, a second upright portion 315 which is parallel to the first upright portion 313 and a third horizontal portion 316 which is held firmly against the frame bight portion 290 by locking fingers 309 locking into lug 301. The first horizontal mounting bracket portion 312 includes a resilient arm 319 with a downwardly turned L-shaped extension 320 being provided with a finger 321 extending transversely to frame 269. As may be seen in FIGS. 12 and 16, the frame bight portion 290 has a central opening 323 through which the extension 320 projects, and that finger 321 is disposed to limit the outward movement of heat responsive element 288. Thus, the location of finger 321 determines the temperature at which the heat responsive element 288 snaps inwardly against the frame bight portion 290. That is to say, if the finger 321 were to move away from the frame bight portion 290, the element 288 would have to reach a higher temperature before it would snap inwardly. Correspondingly, if finger 321 were moved closer towards the frame bight portion 290, a lower temperature is required to snap the element 288 inwardly. Consequently, the location of finger 321 determines the setting of the thermostatic control 386. Formed on mounting bracket arm 319 is an annular, upwardly inclined rim 335 surrounding opening 336. The horizontal portion 312 also includes two spaced resilient ears 238 which pivotally support trip lever 255 which extends horizontally inwardly into toasting chamber 47. The trip lever 255 is bent so that end 340 extends through frame bight portion hole 323 to a point adjacent to heat responsive element 288. When the trip lever 255 is pivoted in a counterclockwise direction as viewed in FIG. 12, end 340 will snap the heat responsive element 288 from its inactive position along frame bight portion 290 to a heat sensing position indicated in broken lines. As discussed hereinbefore, the reset and trip mechanism 220 on bread carriage 156 is designed to pivot trip lever 255 upon the insertion of a slice of bread onto the bread carriage.

The primary purpose of first upright portion 313 and second upright portion 315 is to space the second horizontal portion 314 away from the frame 269. The second horizontal mounting bracket portion 314 has upturned edges 341 for increasing the rigidity thereof and a rectangular opening immediately above the resilient fingers 307 so that a tool may be inserted into said opening for firmly attaching the resilient fingers 307 to mounting lug 302. In addition, the second horizontal portion 314 contains an upwardly formed projection 342 and a thread 343 for receiving an adjustment shaft 345 having a threaded portion 346 and a reduced diameter portion 347 defining a shoulder 348 which abuts against upwardly inclined annular rim 335. With this construction, the rotation of adjustment shaft 345 causes a displacement of arm 319 which, in turn, changes the location of finger 321 governing the temperature at which the snap acting heat responsive element 288 snaps against the frame bight portion 290. Consequently, the rotation of adjustment shaft 345 varies the color setting of the thermostatic control.

In accordance with the present design, adjustment shaft 345 has an enlarged annular ring 350 provided with longitudinally extending serrations or teeth 351 and an outer shaft portion 353 carrying a split retaining ring 354. Secured to the adjustment shaft 345 is control knob 52 which is disposed for gripping by the user so that the adjustment shaft can be rotated providing a selection of color settings. The knob 52 includes a central bore 357 having an internal annular recess 358 into which retaining ring 354 is received to releasably hold knob 52 to adjustment shaft 345. Along central bore 357 is an enlarged annular surface 360 containing a plurality of serrations or teeth 361 complementary to shaft teeth 351. The meshing of teeth 361 with teeth 351 securely locks the knob 52 to the adjustment shaft 345 to prevent any angular displacement therebetween. If it is desired to change the angular relationship between the knob and shaft, the knob can be moved outwardly until the teeth are disengaged whereupon the knob may be angularly displaced and once again snapped onto the shaft. In this manner, the thermostat can be properly set in order to have a proper correlation between indicia 51 and knob dot 53. The adjustment shaft 345 extends through control housing 50 by means of an elongated slot 363 being formed therein. The gap between the adjustment shaft 345 and the control housing elongated opening 363 is necessarily rather large in order to accommodate an accumulation of assembly tolerances. However, it is desirable to prevent air entering into the control housing through opening 363 so that drafts will not effect the accuracy of thermostatic control 286. To establish a relatively air tight seal at opening 363, a sheet metal plate 365 is provided with an opening 366 through which the adjustment shaft threaded portion 346 passes with a minimum of clearance. A slot opening 367 is struck in plate 365 and receives mounting bracket upright projection 342 to prevent rotation of the plate. A weak compression spring 369 surrounds the adjustment shaft threaded portion 346 and biases the plate 365 against control housing 50 to effect an air seal at the juncture of adjustment shaft 345 and housing opening 363.

For mounting switch assembly 285 to frame 269, mounting bracket third horizontal portion 316 which is secured to the bight frame portion 290 by resilient fingers 309 locking to lug 301 is formed with laterally extending opposed lugs 372 and with an integral resilient finger 371 angled upwardly and inwardly toward adjustment screw 345. Two spaced elongated openings 373 are formed at the juncture of the frame bight portion 290 and the frame flange portions 297 for properly locating the switch assembly 285. As can be seen in FIGS. 11, 12, 13 and 14, switch assembly 285 includes a mounting insulator 375 preferably fabricated from ceramic material and defining a front face 374 and rear face 376. The insulator 375 has a central cutout portion 377, two opposed inwardly extending projections 378 and, immediately thereabove, a transversely extending slot 379 into which extends the third horizontal mounting bracket portion 316 so that the resilient finger 371 biases with sufficient force against slot 379 to firmly secure it to the mounting bracket. The depth of penetration of the portion 316 in slot 379 is limited by lugs 372 abutting against front face 374 to facilitate the subassembly of these two parts. To assist in locking and locating the switch mounting insulator 375 to frame 269, the switch mounting insulator projections 378 are received and nested into frame slot openings 373. With this construction, the mounting insulator 375 is held against frame 269, and the interlocking of projections 378 and the slot openings 373 prevents longitudinal movement and accurately positions the mounting insulator with respect to the frame. Equally spaced on each side of insulator cutout 377 are outer channels 381 and inner channels 382, all of which are parallel, have a rectangular cross section and are formed with a recessed or shoulder portion 383 adjacent to the switch mounting insulator rear face 376.

Extending through the channels 381 are a pair of movable contact blades 385 preferably fabricated from resilient sheet metal material. As can be seen in FIGS. 13 and 18, each movable contact blade has a terminal mounting portion 387 which extends beyond the mounting insulator rear face 376, a locking portion 388 having upturned edges 389 which taper inwardly and a central downwardly angled locking tab 390 with its free end facing away from the terminal mounting portion 387, a downwardly angled portion 391 having mounted near its remote end an electrical contact 392 and a pair of upwardly bent spaced fingers 393. In addition, between the locking portion 388 and the downwardly angled portion 391 is a notched portion 394. The contact blades 385 are locked to the switch mounting insulator 375 by inserting terminal mounting portion 387 through the channels 381 until the locking tab 390 is in locking engagement with insulator recessed portion 383 and the notched portion 394 abuts against the insulator front face 374. The blades 385 are rigidly secured to the switch mounting insulator 375 by the wedging action produced by the tapered upturned edges 389 being forced against the side walls of channel 381 until the locking tab 390 can be sprung downwardly into recessed portion 383. With this construction, no fastening pieces are necessary to hold the contact blades 385 to the switch mounting insulator 375. However, the movable contact blades may easily be removed from the mounting insulator by simply biasing the locking tab 390 upwardly and withdrawing the blade from the channel 381.

Substantially stationary contact blades 396 are formed somewhat similarly to movable contact blades 385 and include a terminal mounting portion 397, locking portion 398 having upturned tapered edges 399 and a bent locking tab 400, notched portion 401 and straight portion 402 having a longitudinally strengthening rib 403 and an electrical contact 404. A rigid connection between stationary contact blade 396 and insulator 375 is obtained by inserting the blade into inner channel 382 until the tapered upturned edges 399 abut against the side walls of the channel, locking tab 400 is biased downwardly into recess 383 and notched portion 401 strikes against the insulator front face 374. After the pair of movable contact blades 385 and stationary contact blades 396 have been assembled to the mounting insulator 375, the electrical contacts 392 are in vertical alignment with the electrical contacts 404.

Before inserting the movable contact blades 385 into the mounting insulator, an insulating actuator 407 having a central point 408 and a pair of end slots 409 is assembled thereto by the actuator being inserted within the pair of upwardly spaced fingers 393 so that the actuator end slots 409 receive the downwardly angled portion 391. Consequently, after the contact blades 385 are assembled to the mounting insulator 375, the insulated actuator 407 is locked to the upper blades without the benefit of additional fastening elements.

As may be seen in FIGS. 12 and 13, the switch assembly 285 is locked to frame 269 so that the actuator central point 408 extends downwardly through frame opening 323 and contacts heat responsive element 388 when said element is inactively positioned as illustrated in FIG. 12 holding the electrical contacts 392 out of engagement with the electrical contacts 404. Once the heat responsive element 288 has moved to the heat sensing position as pictured in FIG. 13, the movable contact arms 385 bias downwardly making a good electrical connection between electrical contacts 392 and contacts 404, thereby closing the switch. Upon the return of heat responsive element 288 to the inactive position, it engages the insulated actuator central point 408 causing the pair of contact blades 385 to swing upwardly a distance sufficient to break the electrical connections between the contacts 392 and the contacts 404. Therefore, it should be appreciated that the electrical switch assembly 285 is open whenever the heat sensing element is in the inactive position and is closed whenever the heat sensing element is in the sensing position.

The electrical circuit for toaster 30 is relatively simple. As can be seen in FIG. 4, a pair of electrically conducting insulated wires 412 lead from the cord 88 and are attached to the stationary contact blade terminal mounting portions 397 by any suitable means such as welding. Another pair of suitable electrical conducting insulated wires 413 are in good electrical attachment with the movable contact blade terminal mounting portions 387 and lead to and are attached to the terminals 148 and 149 positioned at opposite ends of resistance wire 140. Therefore, when the switch assembly 285 is closed and the cord 88 is attached to a source of electrical power, an electrical potential is imposed on the resistance wire 140. However, when the switch 285 is open, the resistance wire 140 is not in electrical connection with the power cord 88. In this manner, the electrical switch assembly 285 is of the double pole type so that the user is not subjected to the resistance wire 140 being connected to an electrical power source when the switch assembly 285 is open.

An alternate embodiment thermostatic control 415 is illustrated in FIG. 17. This thermostatic control can be employed if it is not desired to have a fully automatic toaster and thereby eliminate the need for reset and trip mechanism 220. Therefore, thermostatic control 415 includes means for manually moving the heat sensing element 288 from the inactive position to a heat sensing position shown in broken lines. Parts in FIG. 17 which are identical to corresponding parts in FIG. 12 bear, for simplicity sake, the same reference numerals. It should be noted that electrical switch assembly 285 is exactly the same as employed with the fully automatically controlled arrangement disclosed in FIG. 12. Since no reset and trip mechanism is used, there is no trip lever 255 supported by mounting bracket 305. Threadedly mounted to the mounting bracket 305 is adjustment shaft 417 having a longitudinally extending passageway 418 extending completely therethrough, a threaded portion 419 which is in engagement with bracket 305, annular ring 420 having teeth 421 on its periphery and outer shaft portion 422 on which split retaining ring 424 is mounted. The threaded portion 419 has an end 426 for engagement with arm 319 in the same manner as illustrated in FIG. 12.

Carried on adjustment shaft 417 is a color control knob 430 preferably molded of a suitable plastic. The knob 430 is molded with a central bore 431 having an enlarged annular toothed portion 432 at one end of bore 430 and at the other end, an enlarged cavity 433. When the knob 430 is mounted to adjustment shaft 417, the bore 431 is in engagement with the outer shaft portion 422, and the enlarged toothed portion 432 is in engagement with the toothed annular ring 420 in a manner similar to that disclosed with reference to FIG. 12. For the purpose of limiting the angular movement of knob 430, the mounting bracket upright projection 342 enters into the knob and abuts against spaced portions thereof not shown in the drawing. Positioned within knob cavity 433 is a unitary spring actuator 435 having a compression spring portion 436 disposed around adjustment shaft 417 and an elongated pin portion 437 which extends through adjustment shaft passageway 418 so that it extends adjacent to the heat responsive element 288 as pictured in solid lines in FIG. 17. Enclosing the knob cavity 433 is push button 440 preferably formed from plastic material and being provided with a plurality of hook-shaped feet 441 which are adapted to spring inwardly when the button 440 is attached to the knob 430. Once assembled, the button hook-shaped feet 441 snap into spaced recessed areas 444 and prevent the withdrawal of the button from the knob. Therefore, the button 440 is in sliding engagement with knob 430 and rests on the top of spring actuator 435. The compression spring portion 436 is sufficiently strong to bias the button 440 to its outer position shown in FIG. 17. However, if the button 440 is depressed by the user, the button forces the spring actuator 435 downwardly so that the pin portion 437 moves the heat responsive element 288 to its outer sensing position shown in broken lines. Once the user releases the button 440, the spring actuator 435 biases the button again to its outer position. Therefore, it should be appreciated that the user, merely by pressing on button 440, can move the heat responsive element to the sensing position which closes the switch assembly 285 and start the toasting cycle.

The rotation of color control knob 430 causes the adjustment shaft to move vertically with respect to the mounting bracket 305 and, therefore, changes the location of arm 319 which governs the sensing position of heat responsive element 288 thereby controlling the degree of toasting. To facilitate the molding of color control knob 430, there are a plurality of passageways 443 leading from one end of the knob to the recessed areas 444 which receive the hook-shaped button feet 441.

As indicated hereinbefore, the thermostatic control and switch assembly 55 is enclosed by a rectangularly shaped control housing 50 defining an elongated slot 363 through which the thermostatic control adjustment shaft 345 extends. While the housing does bear indicia 51 so that the user may easily select the color setting he desires, the primary purpose of the housing is to protect the thermostatic control and switch assembly 55. In order that consistent operation of the thermostatic control 286 may be accomplished, it is required that no unusual or intermittent drafts be allowed to strike the thermostatic control. Thus, while it is desirable to have a controlled cooling of the thermostatic control 286, it is undesirable to have occasional drafts or even dirt reach the thermostatic control and switch assembly 55.

For the purpose of locking the control housing 50 to the shell 34, shell side wall depressed area 260 is formed with two spaced, vertically aligned, crescent-shaped openings 446 at one end of the depressed area and a pair of similarly shaped and spaced openings 448 at the other end of the depressed area, as may be clearly seen in FIGS. 4 and 7. Control housing 50 is preferably formed from sheet material such as aluminum and has a pair of spaced angular arms or tabs 450 which are disposed to be inserted through openings 446 whereby the housing may be pivoted due to this releasable hinge connection. It should be appreciated that housing arms 450 are bent sufficiently so that the ends thereof strike against the inside surface of shell side wall 41 to insure a rigid fit between the housing and the shell. Along the opposite edge of housing 50 from the edge containing arms 450 are a pair of spaced latching inserts or tabs 452 including an outwardly, laterally angled barb 453. Thus, when housing arms 450 are inserted into openings 446 and housing 50 is pivoted, the pair of inserts 452 enter into openings 448, and barbs 453 latch to the toaster shell side wall 41 since the free distance between the housing arms 450 and inserts 452 is greater than the distance between openings 446 and 448. Consequently, there is a lateral biasing force imposed upon the housing 50 when assembled to the toaster shell 34. Furthermore, it can be seen in FIG. 7 that the angled housing arms 450 striking against the inside surface of shell wall 41 establishes a biasing force which tends to pivot the inserts 452 outwardly from the outer shell wall 41 thereby ensuring a rigid latching connection between the inserts and the shell wall. Therefore, the housing 50 is rigidly secured to the shell 34 in such a manner as to prevent any looseness therebetween. It should be appreciated that no additional fastening members are required to rigidly secure the control housing 50 to the toaster shell 34 and that the housing may be readily released from the shell simply by moving the housing inserts 452 inwardly so that barbs 453 can clear openings 448. The inserts 452 are accessible by inserting a thin suitable tool through end panel notched periphery 68.

Surrounding the thermal motor 150 is a reflector assembly 455 which reflects the radiant energy emitted from resistance wire 140 inwardly towards the toasting chamber 47 for uniformly toasting the bread and constitutes a thermal barrier between the thermal motor and the outer shell 34 so that the outer shell does not become excessively hot when the toaster is used continuously for prolonged periods of time. The reflector assembly 455 comprises two generally L-shaped plates 456 and 457 which, when assembled to the base 38, forms a relatively slender rectangular housing surrounding the thermal motor 150. Along the bottom edges of plates 456 and 457 are formed a plurality of downwardly extending projections which are spaced to be inserted within base locking slots 99 and thereafter staked in such a manner as to rigidly lock both plates to said base. A long leg 454 of each L-shaped plate 456 and 457 is recessed inwardly so that it is as close as practical to the resistance wire 140. As seen in FIG. 7, the plates 456 and 457 trap the axle 177 so that it cannot be withdrawn from base 38. At the free end of the long leg 454 of each plate 456 and 457 is a vertical edge 459 as can be seen in FIG. 5 including two spaced, upwardly extending, L-shaped legs 460, and disposed therebetween is a wedge-shaped member 461 having a downwardly facing surface 462. Each of the L-shaped plates 456 and 457 have a free end shorter leg 458 containing two spaced vertically extending slots 464 adapted to receive L-shaped legs 460 and slot 465 positioned therebetween and located to receive wedge-shaped member 461. Thus, in assembly, the two L-shaped legs 460 are forcibly inserted into slots 464 against the resistive force caused by wedge-shaped member 461 abutting against shorter leg 458 and are moved upwardly until said wedge-shaped member 461 springs in slot 465, and downwardly facing surface 462 is locked within slot 465 making a rigid connection between the reflector plates. In order to disassemble the plates, it is necessary to spring the wedge-shaped member 461 from slot 465 to allow the L-shaped legs 460 to move downwardly a sufficient distance so that they may be withdrawn from slots 464. Therefore, there is provided a connection means between the two L-shaped plates 456 and 457 and base 38 so that these three members may be secured without the need of additional fastening members. The slots 464 are formed in a stepped configuration having the ends thereof in one vertical plane and the center portion recessed therefrom in order that the slot may be easily stamped using known stamping techniques. This is necessary because the L-shaped plates 456 and 457 are fabricated from relatively thin sheet material, and it would not be practical to stamp a slot having a width approximately equal to the thickness of the plate material. Therefore, when the L-shaped legs 460 are inserted into slot 464, the legs bear only against the center portion of the slot and the opposite sides of the upper and lower portions of the slot.

Reflector plate 456 as can be seen in FIG. 4 is formed with a window 470 defined by an outwardly inclined lower flap 471 and an inwardly, downwardly declined upper flap 472. The window 470 is positioned in front of thermostat heat responsive element 288 so that the element may sense the surface temperature of a slice of bread disposed on the bread carriage. Both the upper and lower flaps 471 and 472 are arranged to prevent vertically rising air currents from impinging upon the heat responsive element 288 causing erratic action thereof. At one side of window 470, as can be seen in FIG. 7, is an inwardly directed integral tab 473 to which is riveted an insulator 474. The purpose of insulator 474 is to prevent resistance wire 140 from extending in front of window 470 and thereby effect the operating characteristic of thermostatic control 286. That is to say, during the toasting cycle, it is possible that a strand of resistance wire 140 might sag or that the vertical movement of the thermal motor 150 might permit a strand of resistance wire to be sufficiently close to window 470 to adversely effect the operation of heat responsive element 288. If the resistance wire starts to come too close to window 470, insulator 474 engages the resistance wire and prevents it from moving in front of the window. Also formed in reflector plate 456, as can be seen in FIG. 4, are an elongated opening 476 through which the thermostatic control trigger lever 255 extends, and two spaced openings 478 through which lead wires 413 gain access to the switch assembly 285. To assist in positioning the reflector assembly 455 with respect to shell 34, each plate 456 and 457 is formed with a laterally extending finger 479 engageable with the shell whereby the reflector assembly is properly positioned due to the fingers 479 and the edges of the L-shaped plates short leg 458 contacting the shell 34.

Preventing the slices of bread on the bread carriage from engaging the electrical resistance wire 140 are four identical bread guides 482, shown in FIGS. 20 and 21, which extend from the base flanges 94 and 95 to the shell slot flanges 44 and 45. Preferably, the bread guides are stamped from sheet material and include an upper outwardly curved border 483, spaced side borders 484, bottom border 485 and four vertically extending and inwardly projecting ribs 486, 487, 488 and 489 which are attached at the top to upper curved border 483 and at the bottom to bottom border 485. These ribs are angled slightly with respect to the borders so that when assembled within the toasting chamber, the ribs extend in approximately a vertical plane. Each of the ribs 486, 487, 488 and 489 are joined to the upper curved border in such a manner as to define slots 490 between the top end of said ribs and said upper border and disposed below said border. It should be noted, however, that the upper end of rib 487 does not contain such a slot. When the bread guide is assembled within the toaster, the upper end of rib 487 is received within vertically extending notches 492 spaced along the toaster shell slot flanges 44 and 45 shown in FIG. 4, and the slots 490 receive the bottom edge of either shell flange 44 or 45. With this construction, the upper portion of the bread guide 482 is securely locked to the toaster shell and cannot move in any direction except downwardly. That is to say, movement towards or away from the toasting chamber 47 is prevented by the toaster slot flange being nested within the bread guide slots 490, and longitudinal movement with respect to the toasting chamber is prevented by the upper portion of rib 487 being nested within shell flange notch 492.

The bread guide bottom border 485, as can be seen in FIG. 6, includes two integral spaced clip portions 494 adapted to receive the base flange 94 or 95. Oppositely disposed to the downwardly directed clip portions 494 is an upwardly extending tongue 495 positioned therebetween and angled outwardly so that the base flange is held to the bottom border under tension preventing any looseness therebetween. Furthermore, there are two downwardly directed fingers 496 which are disposed to abut against the top surface of the base flange and thereby control the depth of insertion of the base flange into the clip portions 494. Thus, the fingers 496 constitute an abutment or stop elements against which the base flange abuts. As disclosed hereinbefore, the base flanges 94 and 95 include abutment flaps 97 and 98 which are spaced so they are adjacent to the inner vertical surfaces of clip portions 494 to insure proper location of the bread guides and to prevent any lateral movement thereof. Consequently, the top of the bread guide 492 is securely attached to the toaster shell slot flange, and the lower portion thereof is securely attached to the base flange so that the bread guides are accurately located and are not permitted to move once assembled. It should be appreciated that no additional fastening elements are necessary to hold the bread guides in their proper position. As indicated by the drawings, the four bread guides are disposed so that one is on each side of two slices of bread supposing that two slices of bread are inserted into the shell entrance slot 43.

Catching the crumbs which fall from slices of bread while they are disposed within the toasting chamber 47 is a crumb tray 500, shown in FIG. 4, preferably stamped from sheet metal and formed with upturned periphery 50 for retaining the crumbs therein. The upturned periphery along the back edge of the crumb tray extends laterally from both sides of the crumb tray to form short aligned trunnions 502 which are received in end panel aligned recesses 80 and 81 so that the crumb tray 500 is pivotally mounted to the end panels 64 and 65. The upturned periphery along the front edge of the crumb tray is flattened to form a handle portion 503. For holding the crumb tray in the closed position, the crumb tray 500 is provided with a resilient spring clip 505 which is riveted in place. The spring clip is disposed to latch in locking engagement with base flange opening 103. Whenever the user intends to clean the bottom of the toaster, the crumb tray handle portion 503 is grasped and pivoted downwardly so that spring clip 505 disengages itself from base flange opening 103 and tray trunnions 502 pivot within end panel recesses 80 and 81. After the bottom of the toaster has been cleaned, the crumb tray 500 can be rotated upwardly until the spring clip 505 once again engages the base flange opening 103 thereby closing the base opening 96.

It is desirable during the heating and cooling toasting cycles that the thermal motor 150 move in a vertical controlled manner so that the thermal motor does not tend to move towards either of the end panels. To accomplish controlled longitudinal movement of the thermal motor, the toaster shell flanges 44 and 45 are formed with vertically depending fingers 508 defining opposed vertical surfaces 509 which receive the cross piece upper leg 187 therebetween. As has been described hereinbefore, the upper leg cross piece 187 is rigidly secured to upper trusses 133 and 134. The longitudinal displacement between vertical surfaces 509 is just sufficient to accommodate the thickness of cross piece upper leg 87 plus a working clearance. Therefore, when the upper truss assembly 132 moves vertically, its movement is controlled by the shell flange fingers 508 preventing any longitudinal movement of the upper truss assembly 132.

As is evident from the above explanation, the present toaster is easily and economically assembled and provides a structure requiring a minimum thickness to conserve kitchen counter space. Moreover, the various components are related together in such a manner as to provide a well constructed toaster which performs a high quality toasting operation. While only two embodiments of the present invention have been disclosed and illustrated, it will be understood that the present invention is capable of various changes and modifications. It is intended in the appended claims to cover all such changes and modifications as fall within the true spirit and scope of the present invention.

We claim:

1. In a toaster comprising an outer shell having slot means for receiving one or more slices of bread in an in-line relationship, a toasting chamber within said shell aligned with said slot means and disposed for toasting more than one slice of bread in an in-line relationship, electrically insulating members positioned at each end of said chamber, electrical resistance wire looped horizontally back and forth between opposed edges of said members to form a first heater along one side of said chamber being capable of simultaneously toasting more than one slice of bread on the same side, said wire extending across one of said members and looping back and forth between the opposite opposed edges of said members to form a second heater along the opposite side of said chamber for simultaneously toasting the bread on the opposite sides.

2. In the toaster of claim 1 wherein said members are formed with vertically spaced ears along their edges, said wire extending substantially horizontally between said members and being attached to said members by being looped around said ears.

3. In the toaster of claim 2 including spring means biasing said members longitudinally with respect to and away from said chamber.

4. In the toaster of claim 3 including a base disposed below said toasting chamber and secured to said outer shell, said spring means including a pair of truss springs for each of said members secured at one end to said base and the other end received within notches formed in and located near the bottom of said members, an upper truss disposed above said toasting chamber and extending longitudinally therewith, said spring means including a pair of truss springs for each of said members secured at one end to said upper truss and the other end received within notches formed in and located near the top of said members, said pairs of truss springs biasing said members outwardly.

5. In the toaster of claim 4 wherein said truss springs are formed from resilient sheet material and the longitudinal edges are flanged in their center portions so that the points adjacent to said members, base and upper truss are readily pivoted.

6. An automatic electric toaster comprising an outer shell having long narrow slot means for receiving slices of bread in an in-line relationship, a toasting chamber within said shell and disposed below said slot means, vertically extending electrical insulating members positioned within said shell at each end of said toasting chamber, resistance wire wound between said members to define a first and second heater each of which lies in a vertical plane and positioned on opposite sides of said toasting chamber, switch means within said shell for energizing and deenergizing said first and second heaters, a horizontally extending bread carriage disposed between said first and second heaters for vertical movement from an upper bread receiving and withdrawing position and a lower toasting position, power means within said shell and attached to said bread carriage for moving it between said upper and lower positions, a thermostatic control disposed within said shell adjacent to said bread carriage for controlling the toasting operation by actuating said switch means, said thermostatic control being provided with a movable finger which extends adjacent to said bread carriage when it is in the upper position and which resets said thermostatic control to an active position from an inactive position, said bread carriage supporting a reset mechanism including a pivotally mounted arm which pivots upon the insert of a slice of bread in said slot means on said arm, linkage means attached to said arm, and spring means secured to said bread carriage and linkage means urging said linkage means in a direction causing said arm to pivot upwardly, said linkage means having a leg aligned with said thermostatic control finger when in the starting position with said arm pivoted upwardly and being mounted to said bread carriage for sliding and pivotal movement, said arm being disposed so that the insertion of a slice of bread on said bread carriage can pivot said arm causing said linkage means to slide sufficiently to trip said finger thereby actuating said switch means, said leg disposed so that upon the return of said bread carriage from said bottom to said upper position said leg strikes against said finger causing said leg to pivot and upon the removal of the slice of bread said arm pivots upwardly causing said linkage means to slide whereby said leg no longer engages said finger and said leg can pivot to said starting position.

7. The automatic electric toaster of claim 6 wherein said linkage means forming a projection which abuts against said bread carriage to limit the pivotal movement thereof, said spring means biasing said linkage means to pivot said projection towards said carriage.

8. The automatic electric toaster of claim 7 wherein said linkage means being integrally formable from a single piece of wire having an angular end portion adapted to extend through an aperture in said arm, said arm aperture being sufficiently large with respect to said angular end portion to permit pivoting of said linkage means.

9. In an electric toaster comprising mechanism means including a chamber for receiving a slice of bread for toasting and heater means adjacent to said chamber for cooking the bread, an outer shell enclosing said mechanism means and defining an opening into said toasting chamber, a thermostatic control for controlling the toasting operation mounted on and supported by said shell, said control being provided with a thin heat responsive element mounted to a relatively thick frame which readily transmits heat, said frame being in good heat transfer relationship with said shell whereby said element can dissipate heat to said frame and said frame can readily transfer heat to said shell.

10. In the electric toaster of claim 9 wherein said element is arranged to move from a sensing position to an inactive position where a greater portion of said element is in contact with said frame so that the heat transferred to said element during the toasting cycle can be transmitted to said frame.

11. In the electric toaster of claim 10 including a reflecting shield between said heater means and said shell reducing the heat transfer therebetween, said shield being provided with an opening in front of said element so that said element can sense the radiant energy from the surface of the toasting bread.

12. In an electric toaster comprising mechanism means including a chamber for receiving a slice of bread for toasting, an outer shell enclosing said mechanism means and defining an opening into said toasting chamber, an adjustable thermostatic control for controlling the toasting cycle mounted on and supported by said shell, a housing being secured to said shell enclosing said thermostatic control and formed with an opening therein, said thermostatic control having an adjustment shaft extending through said housing opening whereby the user can manually change the thermostatic control setting.

13. In the electric toaster of claim 12 wherein said housing being formed with integral hinge means along one side which cooperates with complementary integral shell hinge means for releasably hinging said housing to said shell, said housing and shell hinge means biasing said housing to pivot it outwardly from said shell, said housing being provided with integral latching means along the opposite side thereof and cooperating with complementary integral latching means on said shell whereby when said housing hinge means is operatively engaged with said shell hinge means and said housing is pivoted to said shell so that said housing and shell latching means lock together said housing is rigidly secured to said shell.

14. In the electric toaster of claim 13 wherein said housing hinge means including integral spaced angular tabs which are adapted for insertion into complementary shell openings forming a hinge connection which is not outwardly visible, said housing latching means including spaced tabs each of which having locking projections and said shell having complementary apertures for receiving said latching means tabs whereby said locking projections releasably lock said housing to said shell and said housing and shell latching means are not outwardly visible.

15. In the electric toaster of claim 12 including a member slidably mounted on said thermostatic control shaft and being larger than said housing opening through which said shaft extends, spring means carried by said shaft and biasing said member against said housing forming an air seal for preventing air flow into said housing.

16. In an electric toaster comprising mechanism means for receiving a slice of bread and including an electric heater for toasting bread, an outer shell enclosing said mechanism means, an adjustable thermostatic control mounted on and supported by said shell, said thermostatic control disposed for reacting to the toasting of the bread and for terminating the toasting operation by controlling said heater.

17. In the electric toaster of claim 16 wherein said electric heater including resistance wire strung horizontally and opening back and forth adjacent to the location for receiving a slice of bread, said adjustable thermostatic control having an elongated heat responsive element horizontally disposed between spans of said wire, means shielding said element from radiant energy from said wire whereby said element is responsive to the surface temperature of the slice of bread being toasted.

18. In the electric toaster of claim 17 wherein said mechanism means having a thermal motor including insulating members one of which is disposed near each end of said mechanism means and said resistance wire is wound between said members, a bread carriage adapted for moving from an upper bread receiving position to a lower toasting position, power transmitting means between said thermal motor and said carriage for raising and lowering same, said wire being spaced apart sufficiently in front of said heat responsive element so that the movement of said thermal motor does not effect the amount of radiant energy reaching said element from said wire.

19. In the electric toaster of claim 16 wherein said shell has an elongated horizontally extending opening, said thermostatic control being provided with an elongated rigid frame having a greater coefficient of expansion than said shell and said frame spanning said shell opening, said control frame securely attachable at one end thereof to said shell and the other end thereof held to said shell so that said frame can slide longitudinally with respect to said shell due to differences in thermal expansion between said frame and shell but said frame being restricted from moving transversely.

20. In an electric toaster comprising an outer shell having a bread receiving slot defined by downwardly extending flange means, a base member secured to said shell and having an opening below said shell slot defined by upwardly extending flange means, an integral sheet metal stamping bread guide having an upper border, lower border and a plurality of spaced parallel guiding ribs interconnecting said borders, said lower border having integral means for locking said border to said base flange means, said upper border being lockable to said shell flange means by said shell flange means being insertable between said upper border and said guiding ribs.

21. In the electric toaster of claim 20 wherein at least one of said guiding ribs is positioned adjacent to said upper border whereby a slot is defined therebetween which receives said shell flange means, said shell flange means defining a vertically extending slot into which one of said guiding ribs extends so that said shell flange means prevents said bread guide from moving in all directions except towards said base member.

22. In the electric toaster of claim 20 wherein said lower border integral means including at least one outwardly bent downwardly open clip portion and an outwardly bent biasing portion, said clip portion adapted to receive said base flange means and said biasing portion securely holding said lower border to said base flange means.

23. In the toaster of claim 22 wherein said lower border integral means including two spaced clip portions with said biasing portion disposed therebetween, said base flange means having two spaced integral abutment portions adapted for cooperating with said two clip portions for locating said bread guide with respect to said base member, said lower border being provided with at least one abutment portion limiting the insertion of said base flange means into said clip portions.

24. In an electric toaster comprising an outer shell and a toasting chamber therein, a base and plastic molded end panels one of which is disposed at the end of said base, said base, shell and end panels being securable together enclosing said toasting chamber, said base formed with an opening below said toasting chamber, a crumb tray pivotally mounted to said end panels and disposed to enclose said base opening.

25. In the electric toaster of claim 24 wherein each of said plastic end panels being molded with an aligned recess, said crumb tray formed with outwardly extending aligned trunnions which are adapted for being received within said end panel recesses whereby said crumb tray is pivotally mounted to said end panels.

26. In the electric toaster of claim 25 wherein said crumb tray including resilient clip means, said base formed with an aperture adapted to cooperate with said clip means for selectively locking said crumb tray to said base.

27. In an electric toaster comprising an outer shell having an elongated slot for receiving slices of bread, a vertically extending elongated rigid insulating member disposed near each end of said shell slot, said members having vertically spaced supporting means on their edges, electrical heating element extending horizontally between said members and supported by said supporting means, said heating element defining two spaced heaters both of which lie in vertical planes with said shell slot disposed therebetween so that a toasting chamber is defined between said heaters and below said slot.